(12) United States Patent
Fox

(10) Patent No.: US 11,180,240 B2
(45) Date of Patent: Nov. 23, 2021

(54) INERTERS WITH FRICTION DISK ASSEMBLIES, AND AIRCRAFT HYDRAULIC SYSTEMS AND AIRCRAFT INCLUDING THE SAME

(71) Applicant: The Boeing Company, Chicago, IL (US)

(72) Inventor: Michael Thomas Fox, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 16/838,962

(22) Filed: Apr. 2, 2020

(65) Prior Publication Data

US 2021/0309348 A1    Oct. 7, 2021

(51) Int. Cl.
| | |
|---|---|
| *B64C 13/38* | (2006.01) |
| *B64C 13/42* | (2006.01) |
| *F15B 15/22* | (2006.01) |
| *B64C 13/50* | (2006.01) |

(52) U.S. Cl.
CPC ............ *B64C 13/42* (2013.01); *B64C 13/504* (2018.01); *F15B 15/22* (2013.01); *F15B 2211/8757* (2013.01)

(58) Field of Classification Search
None
See application file for complete search history.

(56) References Cited

U.S. PATENT DOCUMENTS

| 7,225,905 | B2* | 6/2007 | Namuduri | F16F 9/535 |
| | | | | 188/267.1 |
| 10,088,006 | B2 | 10/2018 | Fox et al. | |
| 10,107,347 | B2 | 10/2018 | Fox et al. | |
| 10,145,434 | B2 | 12/2018 | Fox et al. | |
| 10,352,389 | B2 | 7/2019 | Fox et al. | |
| 2017/0335916 | A1* | 11/2017 | Fox | B64C 13/40 |
| 2018/0135717 | A1* | 5/2018 | Fox | B64C 9/02 |
| 2018/0156293 | A1* | 6/2018 | Fox | F16F 7/1022 |
| 2019/0048959 | A1 | 2/2019 | Fox et al. | |
| 2019/0315456 | A1 | 10/2019 | Fox et al. | |
| 2019/0316606 | A1 | 10/2019 | Fox et al. | |
| 2019/0316607 | A1 | 10/2019 | Fox et al. | |

* cited by examiner

*Primary Examiner* — Richard G Davis
(74) *Attorney, Agent, or Firm* — Dascenzo Gates Intellectual Property Law, P.C.

(57) ABSTRACT

Inerters with friction disk assemblies, and aircraft hydraulic systems and aircraft including the same. An inerter comprises an inerter housing containing an inerter fluid, a threaded shaft extending within the inerter housing and fixed relative to the first terminal, and an inerter rod extending at least partially within the inerter housing and fixed relative to the second terminal. The inerter further includes a friction disk assembly that, together with the inerter fluid, is configured to damp a motion of the second terminal relative to the first terminal. The friction disk assembly includes a fixed portion and a rotating portion, and is configured such that rotation of the rotating portion generates a frictional torque that opposes the rotation of the rotating portion. In some examples, the inerter is a component of a hydraulic actuator, an aircraft hydraulic system including the hydraulic actuator, and/or an aircraft including the aircraft hydraulic system.

20 Claims, 9 Drawing Sheets

INERTERS WITH FRICTION DISK ASSEMBLIES, AND AIRCRAFT HYDRAULIC SYSTEMS AND AIRCRAFT INCLUDING THE SAME

FIELD

The present disclosure relates to inerters with friction disk assemblies, and aircraft hydraulic systems and aircraft including the same.

BACKGROUND

Aircraft include one or more movable flight control surfaces such as ailerons on the wings for roll control, elevators on the horizontal tail of the empennage for pitch control, a rudder on the vertical tail of the empennage for yaw control, a nose cone of a missile, and other movable control surfaces. Movement of a flight control surface is typically effected by one or more actuators mechanically coupled between a support member (e.g., a wing spar) and the flight control surface. In many aircraft, the actuators for flight control surfaces are linear hydraulic actuators driven by one or more hydraulic systems.

During flight, the aerodynamic load applied to a flight control surface and the dynamic response of the corresponding hydraulic actuator together may introduce an undesirable degree of resonance and/or flutter of the flight control surface. These effects may be mitigated by utilizing dampers and/or inerters in conjunction with the hydraulic actuator. Thus, there exists a need for inerters with friction disk assemblies, such as to damp a motion of flight control surfaces.

SUMMARY

Inerters with friction disk assemblies, and aircraft hydraulic systems and aircraft including the same, are disclosed herein. An inerter comprises a first terminal and a second terminal that are configured to translate relative to one another along an inerter axis. The inerter additionally includes an inerter housing that contains an inerter fluid, a threaded shaft extending along the inerter axis within the inerter housing, and an inerter rod extending along the inerter axis at least partially within the inerter housing. The threaded shaft is fixed relative to the first terminal and terminates in a shaft free end. The inerter rod is fixed relative to the second terminal. The inerter further includes a friction disk assembly positioned within the inerter housing and operatively coupled to each of the threaded shaft and the inerter rod. The inerter is configured to resist an acceleration of the second terminal relative to the first terminal, and the friction disk assembly and the inerter fluid together are configured to damp a motion of the second terminal relative to the first terminal. The friction disk assembly includes a fixed portion that is at least substantially rotationally fixed relative to the inerter rod and a rotating portion that is configured to rotate about the inerter axis relative to the fixed portion. The friction disk assembly is configured such that the rotating portion rotates relative to the fixed portion about the inerter axis at a rotational velocity that is directly proportional to a linear velocity at which the second terminal translates relative to the first terminal along the inerter axis. The friction disk assembly further is configured such that rotation of the rotating portion relative to the fixed portion creates a shear stress in the inerter fluid that generates a frictional torque that opposes the rotation of the rotating portion relative to the fixed portion.

In some examples, the inerter is a component of a hydraulic actuator. In such examples, the hydraulic actuator includes an actuator housing with a first port and a second port enclosing an actuator volume that contains a hydraulic fluid, a piston positioned within the actuator housing, and an actuator rod extending from the piston and at least partially out of the actuator housing. The piston partitions the actuator volume into a first chamber in fluid communication with the first port and a second chamber in fluid communication with the second port. The actuator rod is configured to translate relative to the actuator housing along an actuator axis. The hydraulic actuator further includes a hydraulic valve that regulates a flow of the hydraulic fluid into and out of the first chamber and the second chamber to control a position of the piston within the actuator housing.

In some examples, the hydraulic actuator is a component of an aircraft hydraulic system for operating one or more flight control surfaces of an aircraft that are operatively coupled to a corresponding one or more control surface support structures of the aircraft. In such examples, the aircraft hydraulic system includes a fluid reservoir containing a volume of hydraulic fluid, one or more hydraulic pumps for pressurizing the hydraulic fluid, and a plurality of hydraulic conduits for conveying the hydraulic fluid among components of the aircraft hydraulic system.

DESCRIPTION

Figure 1:
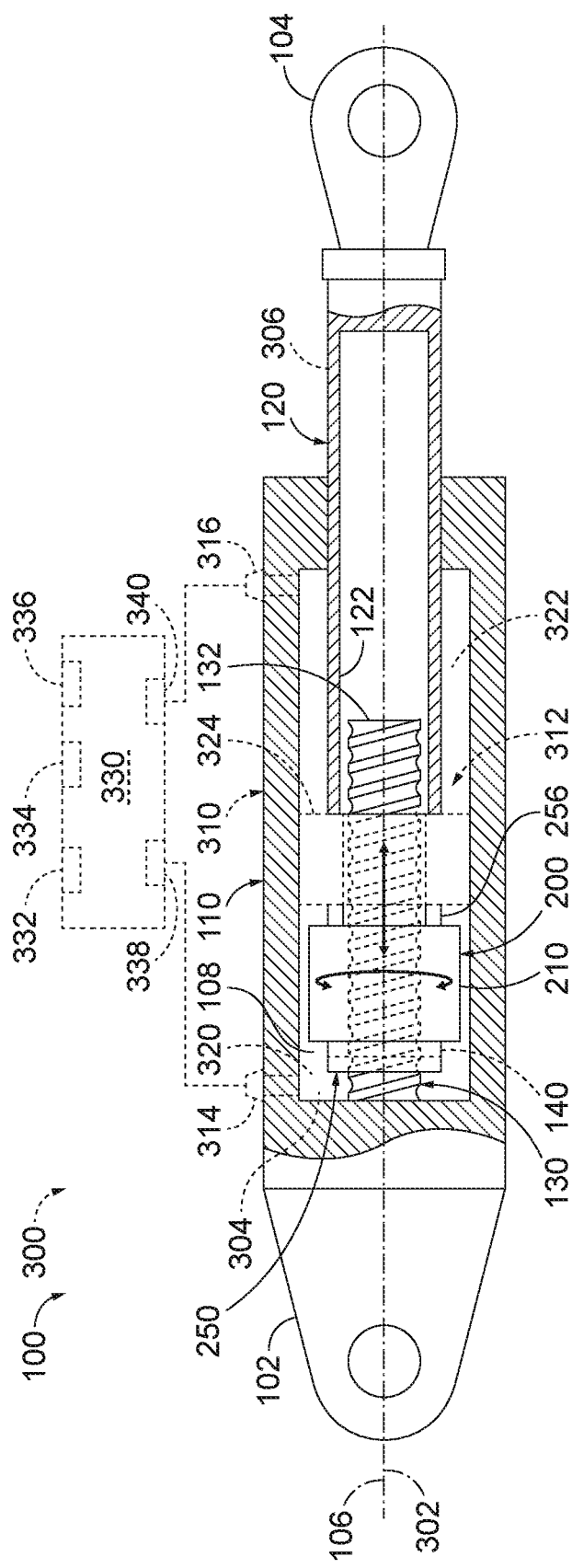
FIG. 1 is a cross-sectional side elevation view schematically illustrating examples of inerters according to the present disclosure.

FIGS. 1-12 provide illustrative, non-exclusive examples of inerters 100 including friction disk assemblies 200, of hydraulic actuators 300 including inerters 100, of aircraft hydraulic systems 50 including hydraulic actuators 300 and/or inerters 100, and/or of aircraft 10 including aircraft hydraulic systems 50, according to the present disclosure. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

Figure 2:
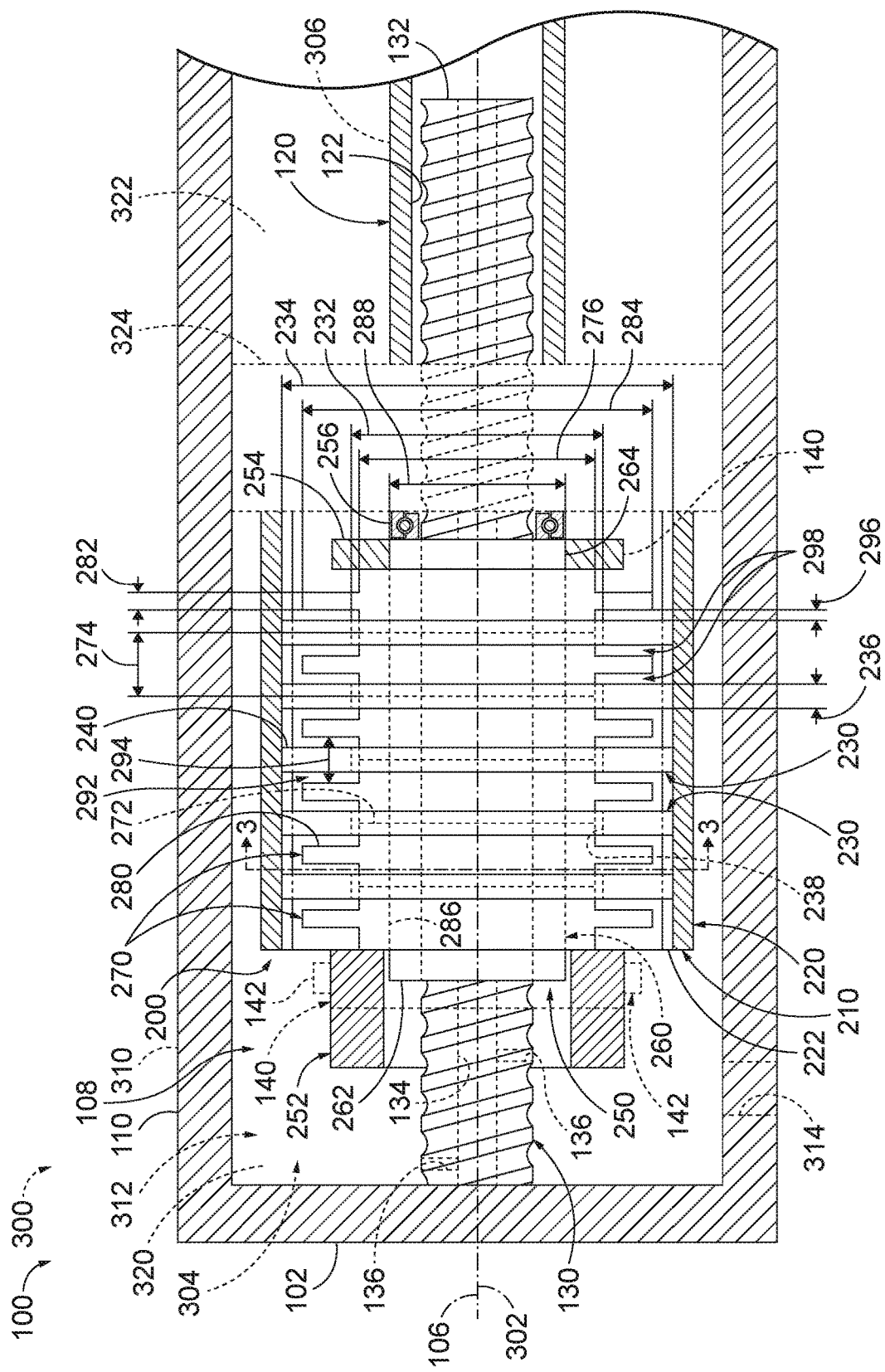
FIG. 2 is a schematic fragmentary cross-sectional side elevation view illustrating examples of inerters according to the present disclosure.

FIGS. 1-2 schematically illustrate examples of inerters 100 including friction disk assemblies 200, with FIG. 2 schematically illustrating friction disk assembly 200 in more detail. As schematically illustrated in FIGS. 1-2, an inerter 100 includes a first terminal 102 and a second terminal 104 (shown in FIG. 1) that are configured to translate relative to one another along an inerter axis 106. Specifically, inerter 100 is configured to resist an acceleration of second terminal 104 relative to first terminal 102.

Additionally, and as described in more detail herein, inerter 100 generally is configured to damp a motion of second terminal 104 relative to first terminal 102 via frictional forces that operate to resist a velocity of second terminal 104 relative to first terminal 102. As used herein, reference to a motion, velocity, and/or an acceleration of a second component (such as second terminal 104) relative to a first component (such as first terminal 102) equivalently may be described as referring to a motion, a velocity, and/or an acceleration of the first component relative to the second component.

As schematically illustrated in FIGS. 1-2, inerter 100 includes an inerter housing 110 containing an inerter fluid 108 and a threaded shaft 130 extending along inerter axis 106 within inerter housing 110 such that threaded shaft 130 is fixed relative to first terminal 102. Threaded shaft 130 terminates in a shaft free end 132 that is distal first terminal 102. Inerter 100 additionally includes an inerter rod 120 extending along inerter axis 106 at least partially within inerter housing 110 such that inerter rod 120 is fixed relative to second terminal 104. In this manner, a motion (e.g., a velocity and/or an acceleration) of second terminal 104 relative to first terminal 102 equivalently may be described as a motion of inerter rod 120 relative to threaded shaft 130.

In some examples, and as schematically illustrated in FIGS. 1-2, inerter rod 120 is hollow and defines an inerter rod bore 122 such that shaft free end 132 is received within inerter rod bore 122. Additionally or alternatively, in some examples, and as schematically illustrated in FIG. 2, threaded shaft 130 is hollow and defines a shaft bore 134 that is open on shaft free end 132. In some such examples, and as further schematically illustrated in FIG. 2, threaded shaft 130 additionally includes one or more radial passages 136 extending radially from shaft bore 134 to an exterior side of threaded shaft 130 to allow fluid flow between shaft bore 134 and the exterior side of threaded shaft 130.

As further schematically illustrated in FIGS. 1-2, inerter 100 additionally includes a friction disk assembly 200 positioned within inerter housing 110 and operatively coupled to each of threaded shaft 130 and inerter rod 120. As described in more detail herein, friction disk assembly 200 and inerter fluid 108 together are configured to damp a motion of second terminal 104 relative to first terminal 102 by generating a shear stress within inerter fluid 108. Inerter fluid 108 may include and/or be any appropriate fluid, such as a viscous fluid, an oil, and/or a hydraulic fluid. As shown in FIG. 1, and as schematically illustrated in more detail in FIG. 2, friction disk assembly 200 includes a fixed portion 210 that is at least substantially rotationally fixed relative to inerter rod 120 and a rotating portion 250 that is configured to rotate about inerter axis 106 relative to fixed portion 210. More specifically, friction disk assembly 200 is operatively coupled to each of threaded shaft 130 and inerter rod 120 such that translating second terminal 104 relative to first terminal 102 along inerter axis 106 urges rotating portion 250 to rotate relative to fixed portion 210 at a rotational velocity that is directly proportional to a linear velocity at which second terminal 104 translates relative to first terminal 102.

As described herein, friction disk assembly 200 is configured such that rotation of rotating portion 250 relative to fixed portion 210 creates a shear stress in inerter fluid 108 that generates a frictional torque that opposes rotation of the rotating portion 250 relative to fixed portion 210. Stated differently, friction disk assembly 200 is configured such that a rotation of rotating portion 250 relative to fixed portion 210 (such as responsive to an external force that translates second terminal 104 relative to first terminal 102) automatically generates a force that opposes such rotation, thereby decreasing a velocity of second terminal 104 relative to first terminal 102. In this manner, references herein to a motion (e.g., a rotational velocity) and/or a change in motion (e.g., a decreasing rotational velocity) of rotating portion 250 relative to fixed portion 210 also may be understood as describing a motion (e.g., a linear velocity) and/or a change in motion (e.g., a decreasing linear velocity) of second terminal 104 relative to first terminal 102. Stated differently, references herein to mechanisms and/or processes corresponding to a damping of a rotational velocity of rotating portion 250 relative to fixed portion 210 are to be understood as equivalently describing mechanisms and/or processes corresponding to a damping of a linear velocity of second terminal 104 relative to first terminal 102.

In some examples, and as schematically illustrated in FIG. 2, fixed portion 210 of friction disk assembly 200 includes a disk housing 220 and one or more outer disks 230 positioned within disk housing 220, and rotating portion 250 includes an inner disk sleeve 260 extending at least partially within disk housing 220 as well as a plurality of inner disks 270 mounted on inner disk sleeve 260. Specifically, in such examples, the plurality of inner disks 270 are mounted on inner disk sleeve 260 such that the plurality of inner disks 270 and inner disk sleeve 260 are constrained to rotate relative to outer disk(s) 230 at least substantially in unison.

In some examples, and as schematically illustrated in FIGS. 1-2, the outer surface of disk housing 220 is spaced apart from the inner surface of inerter housing 110, thus enabling disk housing 220 to translate relative to inerter housing 110 without direct frictional engagement between disk housing 220 and inerter housing 110. The distance by which the outer surface of disk housing 220 is spaced apart from the inner surface of inerter housing 110 may be selected based upon any appropriate considerations. For example, in some examples, inerter fluid 108 flows between disk housing 220 and inerter housing 110 as friction disk assembly 200 translates relative to inerter housing 110, with the viscosity of inerter fluid 108 operating to impede the translation of friction disk assembly 200 relative to inerter housing 110. In such examples, the viscous flow of inerter fluid 108 between disk housing 220 and inerter housing 110 thus amounts to an additional source of damping that opposes the motion of second terminal 104 relative to first terminal 102. Accordingly, the magnitude of this component of the damping force may be varied via selection of the distance separating disk housing 220 and inerter housing 110 and/or via selection of the viscosity of inerter fluid 108.

Figure 3:
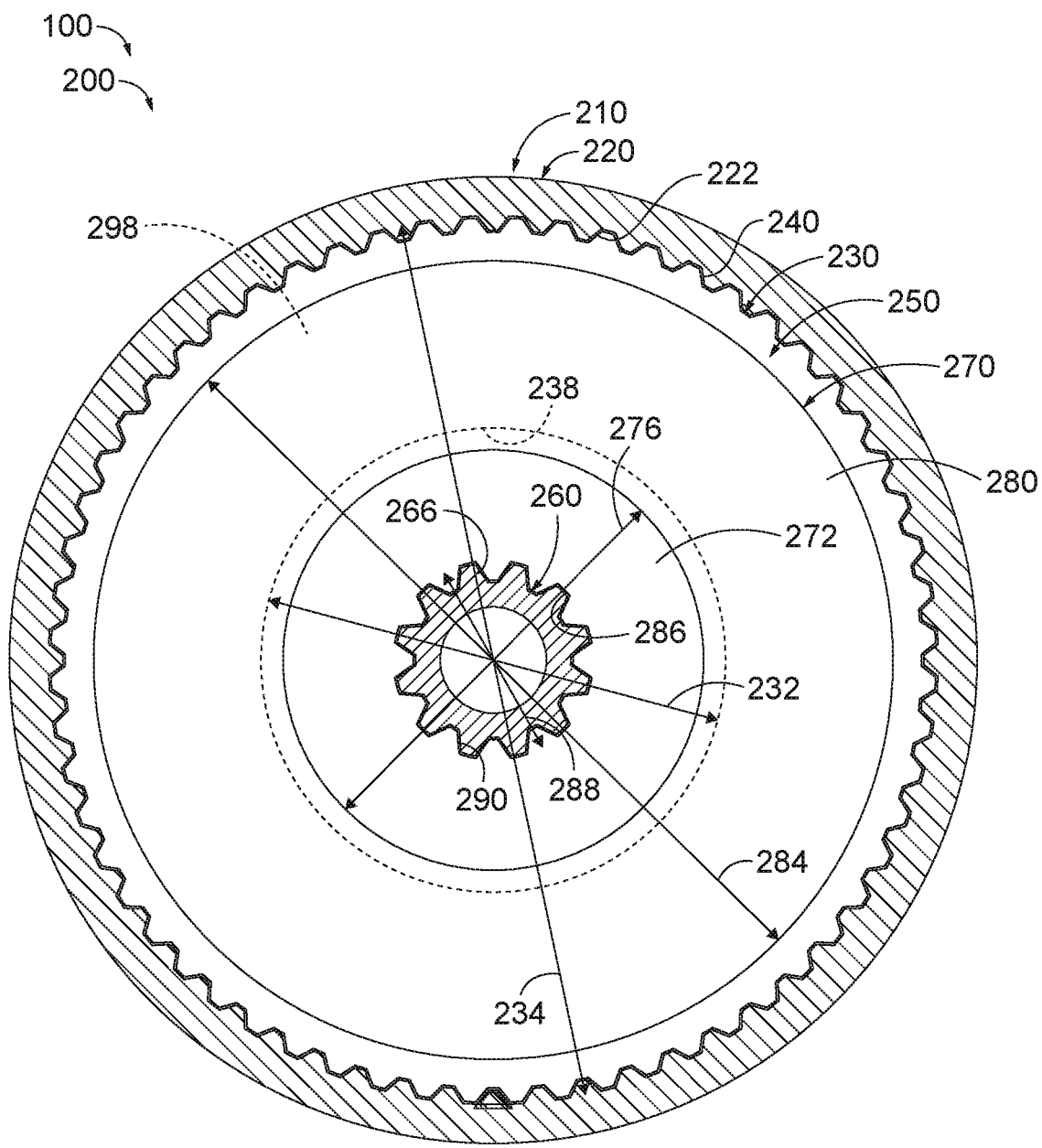
FIG. 3 is a schematic cross-sectional front view taken along the line 3-3 in FIG. 2.
Figure 4:
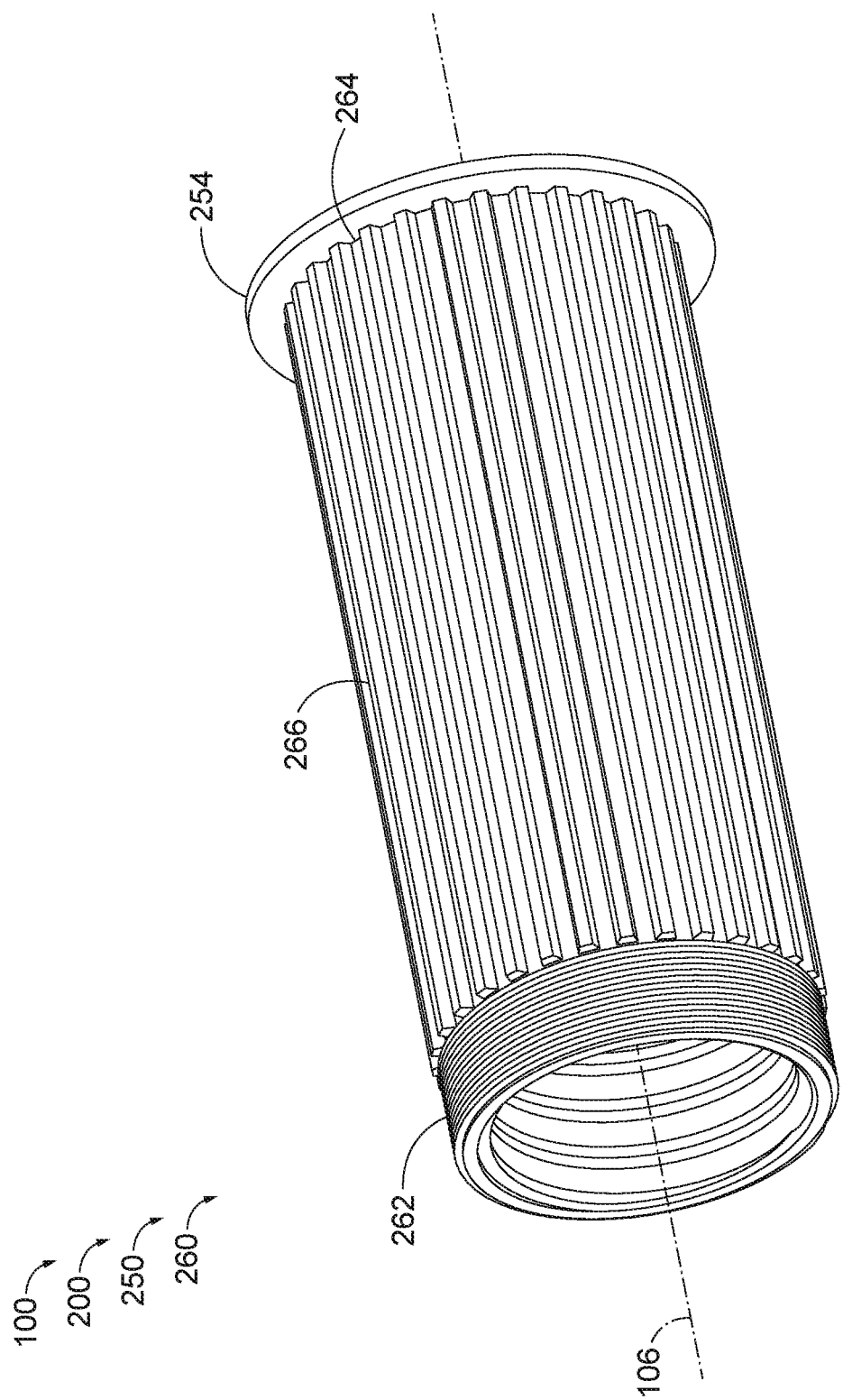
FIG. 4 is a front top side isometric view illustrating an example of an inner disk sleeve according to the present disclosure.
Figure 6:
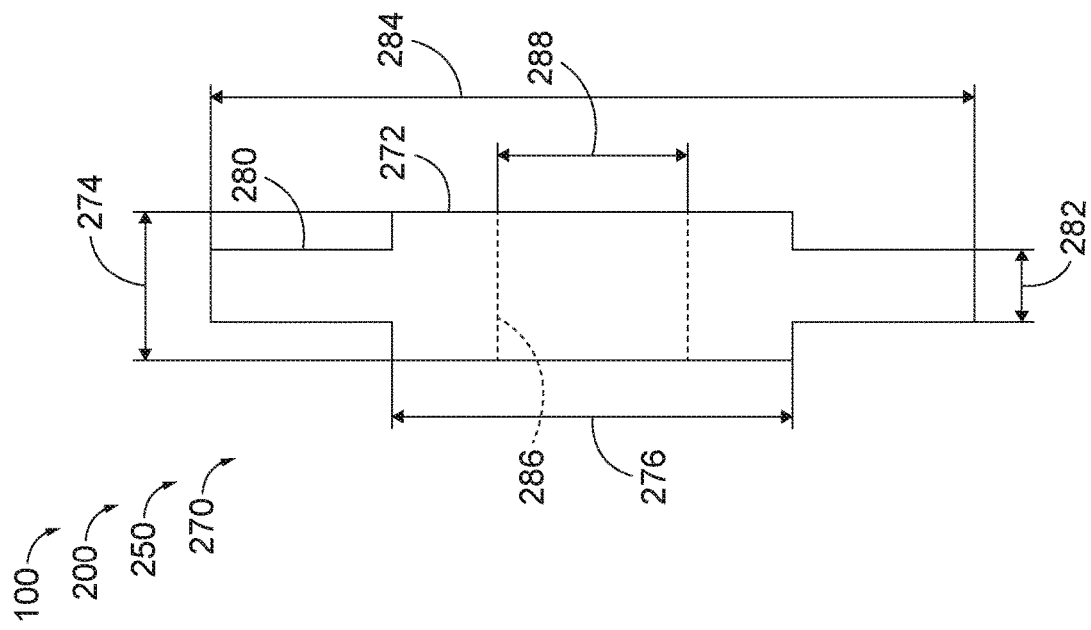
FIG. 6 is a side elevation view illustrating the inner disk of FIG. 5.
Figure 5:
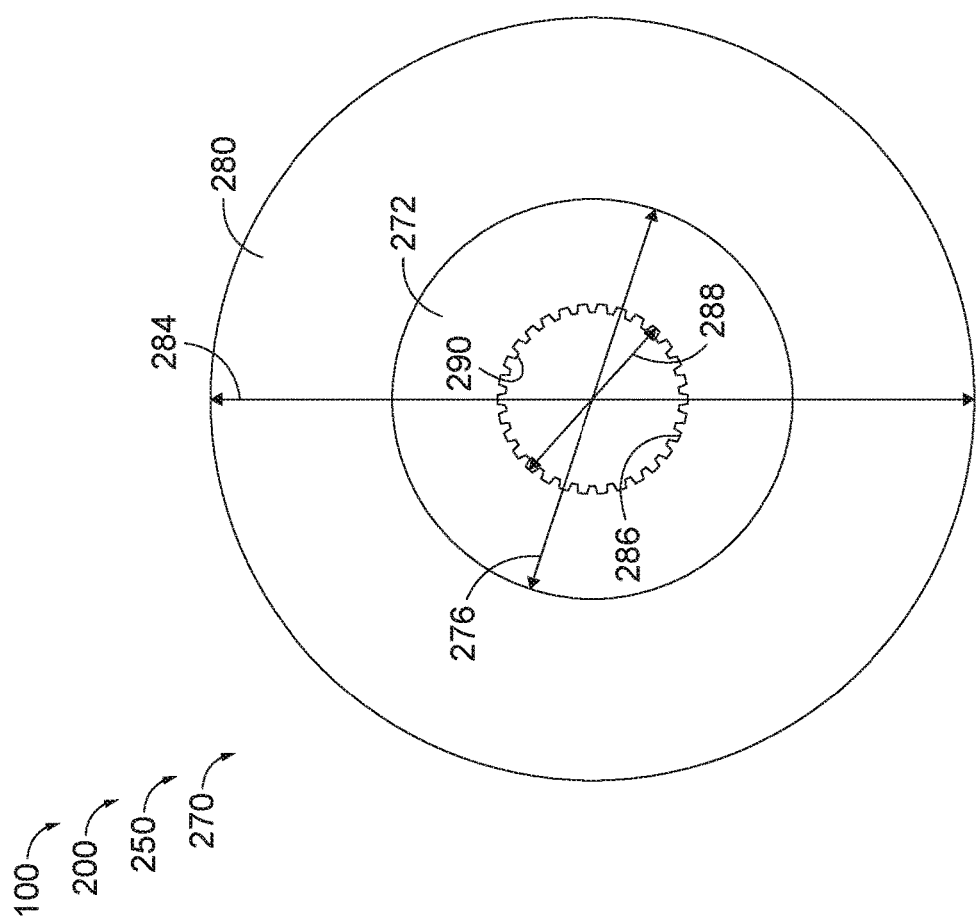
FIG. 5 is a front elevation view illustrating an example of an inner disk according to the present disclosure.
Figure 8:
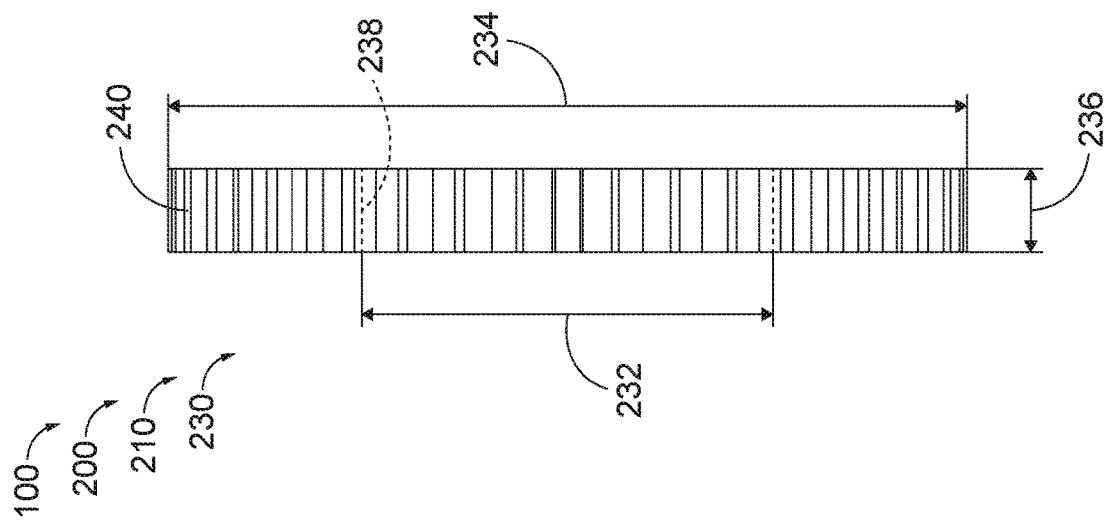
FIG. 8 is a side elevation view illustrating the outer disk of FIG. 7.
Figure 7:
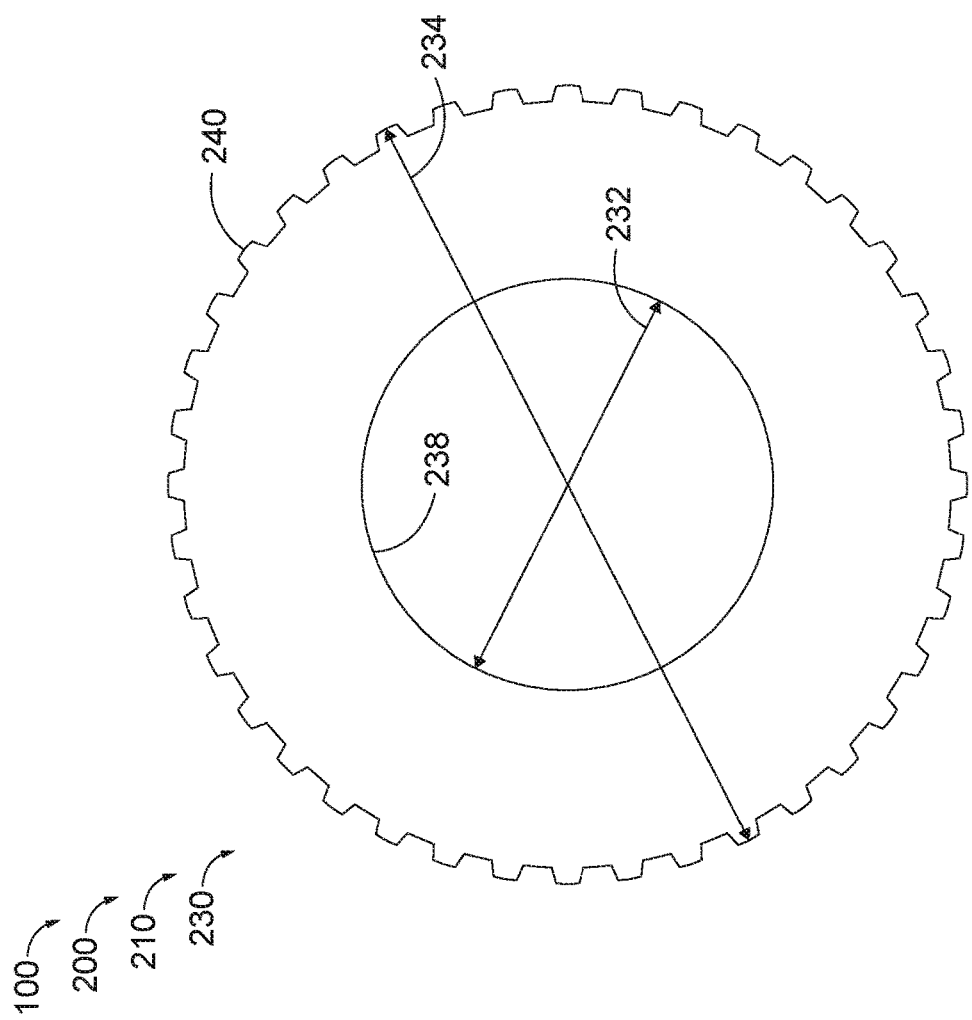
FIG. 7 is a front elevation view illustrating an example of an outer disk according to the present disclosure.

Aspects and components of friction disk assembly 200 are further illustrated in FIGS. 3-10. Specifically, FIG. 3 is a schematic cross-sectional illustration of a portion of friction disk assembly 200 as viewed along the line 3-3 in FIG. 2; FIG. 4 is a less schematic illustration of an example of inner disk sleeve 260; FIGS. 5-6 are less schematic illustrations of an example of inner disk 270; and FIGS. 7-8 are less schematic illustrations of an example of outer disk 230.

With continued reference to FIG. 2, in some examples, outer disk(s) 230 and inner disks 270 are interleaved with one another such that each outer disk 230 is positioned between a corresponding pair of inner disks 270. In such examples, and as schematically illustrated in FIG. 2, each outer disk 230 is separated from each of the corresponding pair of inner disks 270 by a respective shear region 298 that is occupied by inerter fluid 108. Thus, in such examples, rotation of inner disks 270 relative to outer disk(s) 230 produces the shear stress in inerter fluid 108 within each shear region 298, which in turn yields a friction force that exerts a frictional torque on each inner disk 270 that opposes rotation of rotating portion 250 relative to fixed portion 210.

Outer disk(s) 230 and inner disks 270 each may have any appropriate configuration and/or structure, such as for operatively locating each outer disk 230 between the corresponding pair of inner disks 270 and/or for operatively positioning each outer disk 230 and each inner disk 270 within friction disk assembly 200 (e.g., during assembly of friction disk assembly 200). For example, and as schematically illustrated in FIG. 2 and less schematically illustrated in FIG. 6, each inner disk 270 may be described as including an inner disk central region 272 with an inner disk central thickness 274 and an inner disk peripheral region 280 with an inner disk peripheral thickness 282. As shown in FIG. 2, inner disk central thickness 274 and inner disk peripheral thickness 282 each are measured along a direction parallel to inerter axis 106. In some examples, and as perhaps best illustrated in FIG. 6, inner disk central thickness 274 is at least substantially constant across an area of inner disk central region 272. Similarly, in some examples, and as perhaps best illustrated in FIG. 6, inner disk peripheral thickness 282 is at least substantially constant across an area of inner disk peripheral region 280. However, such configurations are not necessary, and it is additionally within the scope of the present disclosure that inner disk central region 272 and/or inner disk peripheral region 280 may have a non-uniform thickness. In some examples, and as described in more detail herein, inner disk central region 272 of each inner disk 270 defines an inner disk aperture 286 such that inner disk sleeve 260 extends through inner disk aperture 286. Such a configuration is schematically illustrated in FIG. 2.

In some examples, and as shown in FIGS. 2 and 6, each inner disk 270 is configured such that inner disk central thickness 274 is greater than inner disk peripheral thickness 282. In some such examples, and as schematically illustrated in FIG. 2, the plurality of inner disks 270 are arranged such that each outer disk 230 is positioned at least substantially between the respective inner disk peripheral regions 280 of the corresponding pair of inner disks 270. More specifically, in some examples, and as schematically illustrated in FIG. 2, the plurality of inner disks 270 are positioned on inner disk sleeve 260 such that inner disk central region 272 of each inner disk 270 abuts inner disk central region 272 of each adjacent inner disk 270. In such examples, and as schematically illustrated in FIG. 2, the respective inner disk peripheral regions 280 of each pair of adjacent inner disks 270 are spaced apart by an inner disk peripheral gap 292, and each outer disk 230 is positioned at least substantially within inner disk peripheral gap 292 formed between the corresponding pair of inner disks 270. As further schematically illustrated in FIG. 2, inner disk peripheral gap 292 may be characterized by a peripheral gap width 294, as measured along a direction parallel to inerter axis 106, between the respective inner disk peripheral regions 280 of the corresponding pair of inner disks 270. Peripheral gap width 294 generally is at least substantially equal to a difference between inner disk central thickness 274 and inner disk peripheral thickness 282.

Each outer disk 230 and each inner disk 270 may have any appropriate form and/or dimensions for operatively positioning each outer disk 230 between the corresponding pair of inner disks 270. As schematically illustrated in FIGS. 2-3 and less schematically illustrated in FIGS. 5-6, each inner disk 270 may be characterized as having an inner disk outer diameter 284, as measured diametrically across inner disk peripheral region 280; an inner disk central diameter 276, as measured diametrically across inner disk central region 272; and an inner disk inner diameter 288, as measured diametrically across inner disk aperture 286. As shown in FIG. 2, each of inner disk outer diameter 284, inner disk central diameter 276, and inner disk inner diameter 288 is measured along a direction perpendicular to inerter axis 106. In some examples, and as schematically illustrated in FIGS. 2-3 and less schematically illustrated in FIGS. 7-8, each outer disk 230 defines an outer disk aperture 238 that in turn defines an outer disk inner diameter 232 of outer disk 230. In some such examples, and as schematically illustrated in FIGS. 2-3, outer disk inner diameter 232 is greater than inner disk central diameter 276 of each of the corresponding pair of inner disks 270. In this manner, in such examples, outer disk aperture 238 of each outer disk 230 extends circumferentially around inner disk central region 272 of one or both of the corresponding pair of inner disks 270 such that outer disk 230 is spaced apart from each inner disk central region 272.

In some examples, and as additionally schematically illustrated in FIGS. 2-3, each outer disk 230 has an outer disk outer diameter 234, as measured diametrically across outer disk 230 along a direction perpendicular to inerter axis 106 (shown in FIG. 2), that is greater than inner disk outer diameter 284 of each of the corresponding pair of inner disks 270. In this manner, and as described in more detail herein, disk housing 220 may engage each outer disk 230 without also engaging each inner disk 270.

As schematically illustrated in FIG. 2 and less schematically illustrated in FIGS. 7-8, each outer disk 230 also may be characterized by an outer disk thickness 236, as measured along a direction parallel to inerter axis 106 (shown in FIG. 2), that is less than peripheral gap width 294 of inner disk peripheral gap 292 separating the corresponding pair of inner disks 270. Accordingly, in such examples, and as schematically illustrated in FIG. 2, each outer disk 230 is spaced apart from each of the corresponding pair of inner disks 270 such that inner disks 270 may rotate relative to outer disk(s) 230 without direct physical contact between inner disks 270 and outer disk(s) 230. More specifically, in some such examples, and as schematically illustrated in FIG. 2, each outer disk 230 is spaced apart from each respective inner disk peripheral region 280 of the corresponding pair of inner disks 270 by a disk spacing 296, as measured along a direction parallel to inerter axis 106. In some such examples, disk spacing 296 is at least substantially equal to half the difference between peripheral gap width 294 and outer disk thickness 236.

In some examples, and as schematically illustrated in FIG. 2 and less schematically illustrated in FIG. 8, outer disk thickness 236 of each outer disk 230 is at least substantially constant across an area of outer disk 230. However, this is not required, and it is additionally within the scope of the present disclosure that outer disk thickness 236 may be non-uniform across the area of outer disk 230.

In some examples, and as schematically illustrated in FIG. 2, each outer disk 230 is positioned at least substantially equidistant from the respective inner disk peripheral regions 280 of the corresponding pair of inner disks 270, such that disk spacing 296 separating outer disk 230 from one of the corresponding pair of inner disks 270 is at least substantially equal to disk spacing 296 separating outer disk 230 from the other of the corresponding pair of inner disks 270. However, this is not required of all examples of friction disk assembly 200 in all instances. For example, in some cases, translating second terminal 104 relative to first terminal 102 results in the plurality of inner disks 270 translating relative to the one or more outer disks 230 as a result of the inertia of each outer disk 230 and the lack of direct physical engagement between each outer disk 230 and either of the corresponding pair of inner disks 270. Accordingly, in such cases, disk spacing 296 between each outer disk 230 and one of the corresponding pair of inner disks 270 at least momentarily decreases, while disk spacing 296 between each outer disk 230 and the other of the corresponding pair of inner disks 270 at least momentarily increases.

As discussed, and as schematically illustrated in FIG. 2, each outer disk 230 is separated from each of the corresponding pair of inner disks 270 by a respective shear region 298 that is occupied by inerter fluid 108. In view of the foregoing description, and as schematically illustrated in FIGS. 2-3, shear region 298 between a given outer disk 230 and either of the corresponding pair of inner disks 270 may be described more specifically as being an annular volume with an inner diameter that is equal to outer disk inner diameter 232, an outer diameter equal to inner disk outer diameter 284, and a thickness equal to disk spacing 296 (shown in FIG. 2). As will be understood by a person of ordinary skill in the art, the shear stress generated in inerter fluid 108 within shear region 298 due to rotation of each inner disk 270 relative to an adjacent outer disk 230 generally will depend on the dimensions of the annular volume corresponding to shear region 298. More specifically, for a given rotational velocity of inner disk 270 relative to outer disk 230, the magnitude of the shear stress generated in inerter fluid 108 within shear region 298—and hence the magnitude of the frictional torque exerted on rotating portion 250—will increase as the difference inner disk outer diameter 284 and outer disk inner diameter 232 increases, and will decrease as disk spacing 296 increases. Accordingly, the rotation-damping characteristics of friction disk assembly 200—and hence the translation-damping characteristics of inerter 100—may be tuned via appropriate selection of the dimensions of outer disk(s) 230 and of inner disks 270.

The damping characteristics of friction disk assembly 200 also may be tuned via selection of the number of outer disks 230 and inner disks 270 in friction disk assembly 200, since the total magnitude of the shear stress generated in inerter fluid 108 (and of the corresponding frictional torque exerted on rotating portion 250) increases with the number of shear regions 298 formed within disk housing 220. Accordingly, friction disk assembly 200 may include any appropriate numbers of outer disks 230 and of inner disks 270, such as may be selected for a given application. As examples, friction disk assembly 200 may include at least 1 outer disk 230, at least 3 outer disks 230, at least 5 outer disks 230, at least 10 outer disks 230, at most 15 outer disks 230, at most 7 outer disks 230, and/or at most 2 outer disks 230. As additional examples, friction disk assembly 200 may include at least 2 inner disks 270, at least 3 inner disks 270, at least 5 inner disks 270, at least 10 inner disks 270, at most 15 inner disks 270, at most 7 inner disks 270, and/or at most 4 inner disks 270. In some examples, the number of inner disks 270 is one greater than the number of outer disks 230, such that every outer disk 230 is positioned between the corresponding pair of inner disks 270.

As discussed herein, each outer disk 230 generally is restricted from rotating relative to inerter rod 120 when rotating portion 250 rotates relative to inerter rod 120. Outer disk(s) 230 and/or disk housing 220 may have any appropriate structure for restricting rotation of each outer disk 230. In some examples, and as schematically illustrated in FIGS. 2-3, disk housing 220 includes a disk housing engagement structure 222, and each outer disk 230 includes an outer disk engagement structure 240 that engages disk housing engagement structure 222 to restrict each outer disk 230 from rotating relative to disk housing 220. In some examples, and as perhaps best illustrated in FIGS. 7-8, outer disk engagement structure 240 of each outer disk 230 is defined on an outer peripheral region of outer disk 230.

In some examples, disk housing engagement structure 222 and each outer disk engagement structure 240 are configured to permit each outer disk 230 to translate relative to disk housing 220 along a direction parallel to inerter axis 106. As a more specific example, and as schematically illustrated in FIGS. 2-3 and less schematically illustrated in FIGS. 7-8, disk housing engagement structure 222 (shown in FIGS. 2-3) and each outer disk engagement structure 240 may include a plurality of splines and/or a plurality of grooves such that each outer disk 230 is restricted from rotating relative to disk housing 220.

Inner disk sleeve 260 may have any appropriate configuration and/or structure, such as for operatively coupling rotating portion 250 to each of threaded shaft 130 and inerter rod 120. In some examples, and as schematically illustrated in FIGS. 2-3, inner disk sleeve 260 is operatively coupled to threaded shaft 130 with threaded shaft 130 extending through inner disk sleeve 260. More specifically, in some such examples, inner disk sleeve 260 is threadably coupled to threaded shaft 130 such that inner disk sleeve 260 rotates relative to threaded shaft 130 about inerter axis 106 as inner disk sleeve 260 translates relative to threaded shaft 130 along inerter axis 106. Stated differently, in such examples, exerting a linear force on inner disk sleeve 260 to translate inner disk sleeve 260 along threaded shaft 130 operates to additionally rotate inner disk sleeve 260 around threaded shaft 130. Inner disk sleeve 260 and threaded shaft 130 may be operatively coupled via any appropriate threaded structure and/or mechanism, such as a ball screw mechanism.

As discussed herein, rotating portion 250 of friction disk assembly 200 generally is configured such that inner disk sleeve 260 and the plurality of inner disks 270 rotate relative to fixed portion 210 at least substantially in unison. Accordingly, in some examples, and as schematically illustrated in FIGS. 2-3 and less schematically illustrated in FIGS. 4-6, inner disk sleeve 260 includes an inner disk sleeve engagement structure 266 (shown in FIGS. 2-4), and each inner disk 270 includes an inner disk engagement structure 290 (shown in FIGS. 2-3 and 5-6) that engages inner disk sleeve engagement structure 266 to restrict each inner disk 270 from rotating relative to inner disk sleeve 260. Stated differently, in such examples, inner disk sleeve engagement structure 266 and inner disk engagement structure 290 together are configured to constrain inner disk sleeve 260 and each inner disk 270 to rotate at least substantially in unison. In this manner, the concurrent translation and rotation of inner disk sleeve 260 relative to threaded shaft 130 urges each inner disk 270 to also rotate relative to threaded shaft 130 and relative to each outer disk 230. In some examples, and as perhaps best illustrated in FIGS. 5-6, inner disk aperture 286 of each inner disk 270 includes inner disk engagement structure 290. In some examples, and as schematically illustrated in FIGS. 2-3 and less schematically illustrated in FIGS. 4-6, inner disk sleeve engagement structure 266 and each inner disk engagement structure 290 includes a plurality of splines and/or a plurality of grooves. Such a configuration may enable each inner disk 270 to translate relative to inner disk sleeve 260 along inerter axis 106, such as to facilitate assembly of friction disk assembly 200.

In some examples, such as an example in which inner disk sleeve engagement structure 266 and/or inner disk engagement structure 290 does not restrict each inner disk 270 from translating relative to inner disk sleeve 260, rotating portion 250 further may include one or more structures for retaining each inner disk 270 upon inner disk sleeve 260. Specifically, in some examples, and as schematically illustrated in FIG. 2, rotating portion 250 includes a first disk retention structure 252 positioned on a first end 262 of inner disk sleeve 260 and a second disk retention structure 254 positioned on a second end 264 of inner disk sleeve 260. In such examples, and as schematically illustrated in FIG. 2, each inner disk 270 is mounted on inner disk sleeve 260 between first disk retention structure 252 and second disk retention structure 254, with first disk retention structure 252 and second disk retention structure 254 together maintaining the plurality of inner disks 270 mounted on inner disk sleeve 260. Stated differently, in such examples, first disk retention structure 252 operates to restrict each inner disk 270 from being removed from first end 262 of inner disk sleeve 260, and second disk retention structure 254 operates to restrict each inner disk 270 from being removed from second end 264 of inner disk sleeve 260.

In some examples, first disk retention structure 252 or second disk retention structure 254 is integrally formed with inner disk sleeve 260. As an example, FIG. 4 illustrates an example in which second disk retention structure 254 is a flange that is integral with inner disk sleeve 260 and that extends away from inerter axis 106. Additionally or alternatively, in some examples, one or both of first disk retention structure 252 and second disk retention structure 254 is configured to be selectively and operatively coupled to inner disk sleeve 260. More specifically, in some such examples, one or both of first disk retention structure 252 and second disk retention structure 254 is a retention nut that is threadably coupled to inner disk sleeve 260. In such examples, the retention nut may include and/or be any appropriate nut, such as a lock nut and/or a jam nut. In the example of FIG. 4, first end 262 of inner disk sleeve 260 is threaded to receive first disk retention structure 252 (not shown) in the form of a retention nut.

Figure 9:
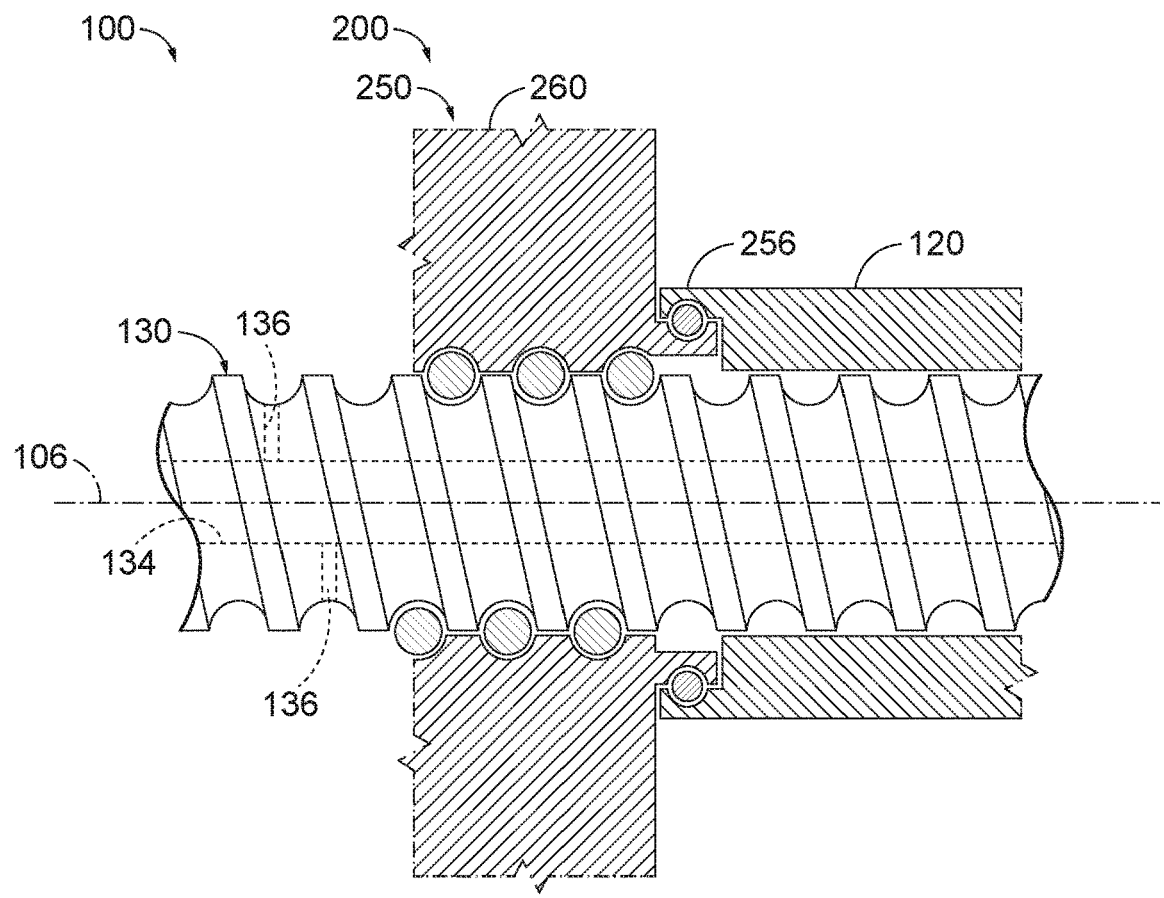
FIG. 9 is a fragmentary cross-sectional side elevation view illustrating a portion of an example of an inerter according to the present disclosure.
Figure 10:
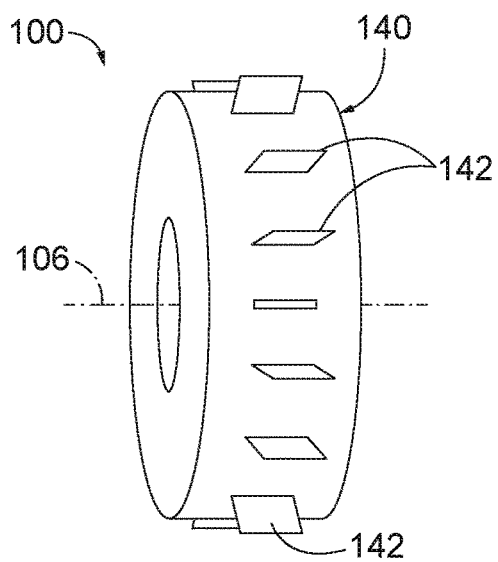
FIG. 10 is a front side isometric view illustrating an example of a flywheel that includes a plurality of flywheel protrusions, according to the present disclosure.

As discussed, friction disk assembly 200 is operatively coupled to each of threaded shaft 130 and inerter rod 120 such that translating second terminal 104 relative to first terminal 102 along inerter axis 106 urges rotating portion 250 to rotate relative to fixed portion 210. Stated differently, inner disk sleeve 260 may be described as being operatively coupled to fixed portion 210 and/or inerter rod 120 such that translating inerter rod 120 relative to threaded shaft 130 along inerter axis 106 operates to translate inner disk sleeve 260 along threaded shaft 130, which in turn operates to rotate inner disk sleeve 260 relative to threaded shaft 130 about inerter axis 106. Accordingly, in some examples, and as schematically illustrated in FIGS. 1-2 and less schematically illustrated in FIG. 9, friction disk assembly 200 includes a sleeve bearing 256 that operatively couples inner disk sleeve 260 to fixed portion 210 and that is configured to enable inner disk sleeve 260 to rotate relative to fixed portion 210. In some such examples, sleeve bearing 256 operatively couples inner disk sleeve 260 to fixed portion 210 such that inner disk sleeve 260 and fixed portion 210 translate relative to threaded shaft 130 along inerter axis 106 at least substantially in unison (and while inner disk sleeve 260 rotates relative to fixed portion 210). Sleeve bearing 256 may include and/or be any appropriate structure, such as a thrust bearing. FIG. 9 additionally illustrates an example in which threaded shaft 130 defines shaft bore 134 and includes a plurality of radial passages 136 that fluidly connect shaft bore 134 and a region exterior of threaded shaft 130.

As discussed, inerter 100 generally is configured to resist an acceleration of second terminal 104 relative to first terminal 102. In some examples, such functionality at least partially results from a rotational inertia of rotating portion 250. That is, although friction disk assembly 200 generally is configured to oppose a rotation of rotating portion 250 relative to fixed portion 210, rotating portion 250 still possesses a rotational moment of inertia (based upon the mass distribution of its components) that resists an angular acceleration of rotating portion 250. Because the angular velocity of rotating portion 250 is at least substantially directly proportional to the linear velocity of second terminal 104 relative to first terminal 102, the moment of inertia of rotating portion 250 also yields the effect of resisting a linear acceleration of second terminal 104 relative to first terminal 102. Accordingly, the extent to which inerter 100 resists acceleration of second terminal 104 relative to first terminal 102 may be varied via variation of the moment of inertia of rotating portion 250, such as via appropriate selection of the material properties and/or geometrical configurations of inner disk sleeve 260, each inner disk 270, first disk retention structure 252, and/or second disk retention structure 254. Additionally or alternatively, in some examples, and as schematically illustrated in FIGS. 1-2, inerter 100 and/or rotating portion 250 includes a flywheel 140 that is configured to rotate about inerter axis 106 relative to threaded shaft 130 with a rotational velocity that is proportional to a linear velocity at which inerter rod 120 translates with respect to threaded shaft 130. Accordingly, in such examples, the capacity of inerter 100 to resist acceleration of second terminal 104 relative to first terminal 102 further may be tuned via selection of the material properties and geometrical configuration that contribute to the moment of inertia of flywheel 140. Examples of inerters 100 that utilize flywheels 140 in this manner and/or that exhibit one or more other characteristics of inerters 100 according to the present disclosure are disclosed in U.S. Pat. No. 10,088,006, U.S. Patent Application Publication No. 2019/0048959, U.S. Pat. Nos. 10,107,347, 10,352,389, and U.S. patent application Ser. No. 16/811,979, the complete disclosures of which are hereby incorporated by reference.

When present, flywheel 140 may have any appropriate configuration and may be integrated into inerter 100 in any appropriate manner. In some examples, and as schematically illustrated in FIGS. 1-2, flywheel 140 is threadably coupled to threaded shaft 130 such that flywheel 140 rotates relative to threaded shaft 130 about inerter axis 106 as flywheel 140 translates relative to threaded shaft 130 along inerter axis 106. In some such examples, flywheel 140 is fixedly coupled to rotating portion 250 and/or inner disk sleeve 260. Additionally or alternatively, flywheel 140 may be configured to be selectively and operatively coupled to one or more other components of rotating portion 250, such as to inner disk sleeve 260. More specifically, in some such examples, and as schematically illustrated in FIG. 2, first disk retention structure 252 and/or second disk retention structure 254 may include and/or be flywheel 140. In such examples, rotating portion 250 may be described as including flywheel 140.

In some examples, flywheel 140 also may be configured to resist and/or damp a rotational velocity of flywheel 140 and/or of rotating portion 250, such as via interaction with inerter fluid 108. In some such examples, and as schematically illustrated in FIG. 2, flywheel 140 includes a plurality of flywheel protrusions 142 extending radially away from inerter axis 106. In such examples, when flywheel 140 rotates about inerter axis 106, flywheel protrusions 142 move through inerter fluid 108 to produce a viscous damping force that impedes rotation of flywheel 140 about inerter axis 106. In this manner, flywheel protrusions 142 also may be described as operating to damp and/or resist a velocity of second terminal 104 relative to first terminal 102. An example of flywheel 140 including flywheel protrusions 142 is less schematically illustrated in FIG. 10.

Inerters 100 according to the present disclosure may be utilized in conjunction with any appropriate structure and/or mechanism. For example, inerter 100 may be utilized in conjunction with, and/or may be a component of, a hydraulic actuator. FIGS. 1-2 schematically illustrate examples of such a configuration. Specifically, in some examples, and as schematically illustrated in FIGS. 1-2, a hydraulic actuator 300 includes an actuator housing 310 enclosing an actuator volume 312 that contains a hydraulic fluid 304, a piston 324 positioned within actuator housing 310, and an actuator rod 306 extending from piston 324 and at least partially out of actuator housing 310 (as shown in FIG. 1). In such examples, actuator rod 306 is configured to translate relative to actuator housing 310 along an actuator axis 302. In such examples, and as schematically illustrated in FIG. 1, actuator housing 310 includes a first port 314 and a second port 316, and piston 324 partitions actuator volume 312 into a first chamber 320 in fluid communication with first port 314 and a second chamber 322 in fluid communication with second port 316. In this manner, regulating a flow of hydraulic fluid 304 into and out of first chamber 320 via first port 314 and/or into and out of second chamber 322 via second port 316 operates to selectively position piston 324 relative to actuator housing 310, thereby selectively positioning actuator rod 306 relative to actuator housing 310. To this end, in such examples, and as schematically illustrated in FIG. 1, hydraulic actuator 300 additionally includes a hydraulic valve 330 that regulates a flow of hydraulic fluid 304 into and out of first chamber 320 and second chamber 322 to control a position of piston 324 within actuator housing 310.

In the examples of FIGS. 1-2, hydraulic actuator 300 includes inerter 100. More specifically, in the examples of FIGS. 1-2, actuator housing 310 is inerter housing 110, actuator rod 306 is inerter rod 120, and hydraulic fluid 304 is inerter fluid 108. In some such examples, and as schematically illustrated in FIG. 2, fixed portion 210 of friction disk assembly 200 includes piston 324. In some such examples, disk housing 220 is fixedly coupled from piston 324 and/or extends from piston 324.

Additionally or alternatively, in some examples, and as schematically illustrated in FIG. 2, sleeve bearing 256 operatively couples inner disk sleeve 260 to piston 324. More specifically, in some such examples, and as further schematically illustrated in FIG. 2, each of inner disk sleeve 260 and piston 324 forms a portion of sleeve bearing 256.

As discussed, in some examples and as schematically illustrated in FIG. 2, threaded shaft 130 defines shaft bore 134 and includes a plurality of radial passages 136 that fluidly connect shaft bore 134 and a region exterior of threaded shaft 130. Such a configuration may be particularly beneficial in an example in which inerter 100 is a component of hydraulic actuator 300. Specifically, in such examples, and with reference to FIGS. 1-2, enabling fluid communication between a region within inerter rod bore 122 and first chamber 320 enables hydraulic fluid 304 to enter and exit the region within inerter rod bore 122 as inerter rod 120 translates relative to threaded shaft 130.

Hydraulic valve 330 may be configured to regulate the flow of hydraulic fluid 304 in any appropriate manner. In some examples, and as schematically illustrated in FIG. 1, hydraulic valve 330 includes a fluid input 332 configured to receive a high-pressure flow of hydraulic fluid 304 and a fluid return 336 configured to discharge a low-pressure flow of hydraulic fluid 304. In such examples, hydraulic valve 330 additionally includes a first outlet 338 that is fluidly connected to first chamber 320 of actuator housing 310 via first port 314 and a second outlet 340 that is fluidly connected to second chamber 322 of actuator housing 310 via second port 316. In such examples, hydraulic valve 330 is configured to regulate the flow of hydraulic fluid 304 from fluid input 332 to actuator housing 310 (e.g., into and/or out of first chamber 320 and/or second chamber 322) and to fluid return 336 to control the position of piston 324 within actuator housing 310. In some examples, and as further schematically illustrated in FIG. 1, hydraulic valve 330 further includes a fluid boost input 334 that is configured to receive a flow of hydraulic fluid 304 at a boost pressure that is higher than the pressure of the high-pressure flow of hydraulic fluid 304 received at fluid input 332.

Figure 11:
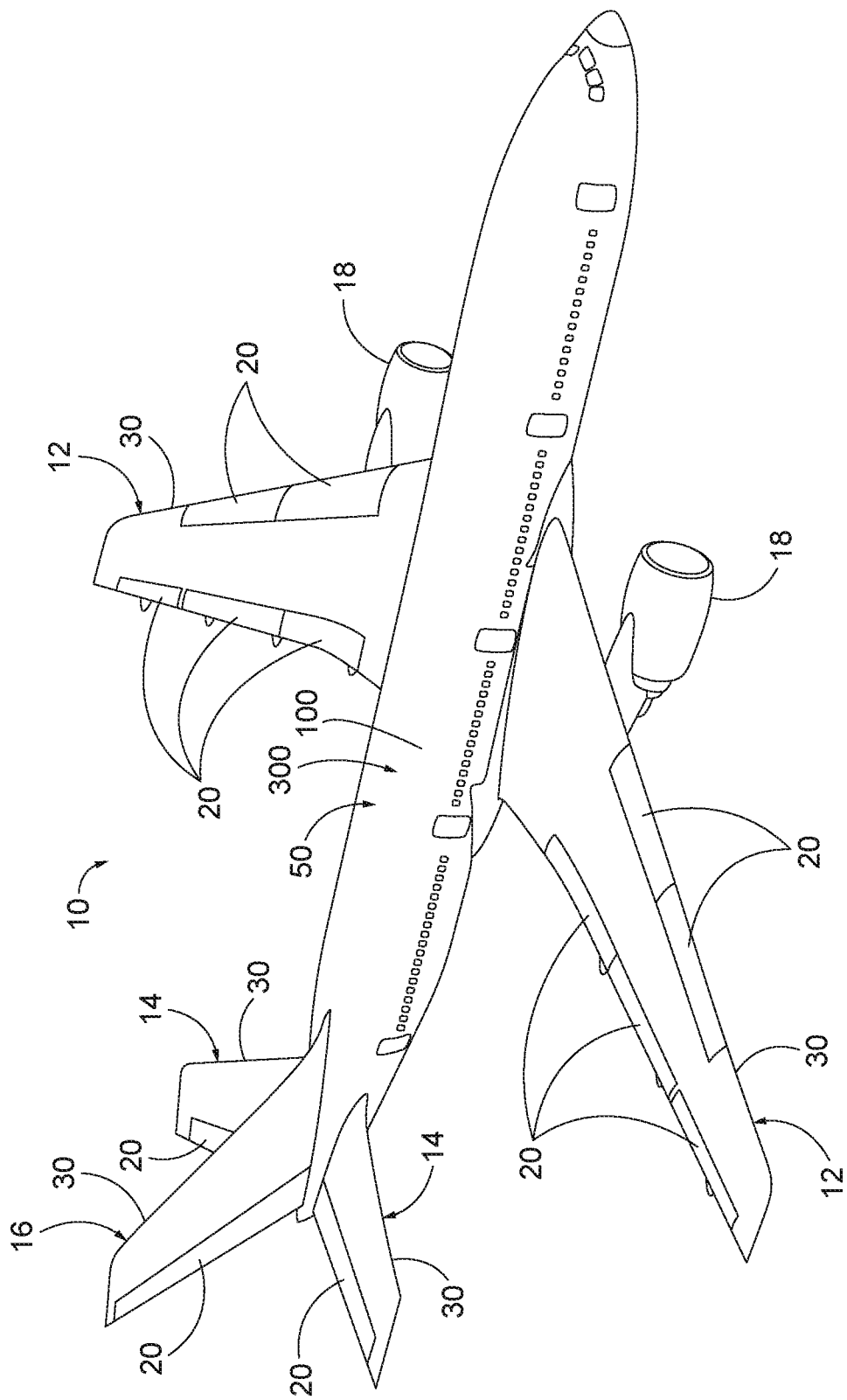
FIG. 11 is a schematic representation of an example of an aircraft that includes aircraft hydraulic systems and/or inerters according to the present disclosure.
Figure 12:
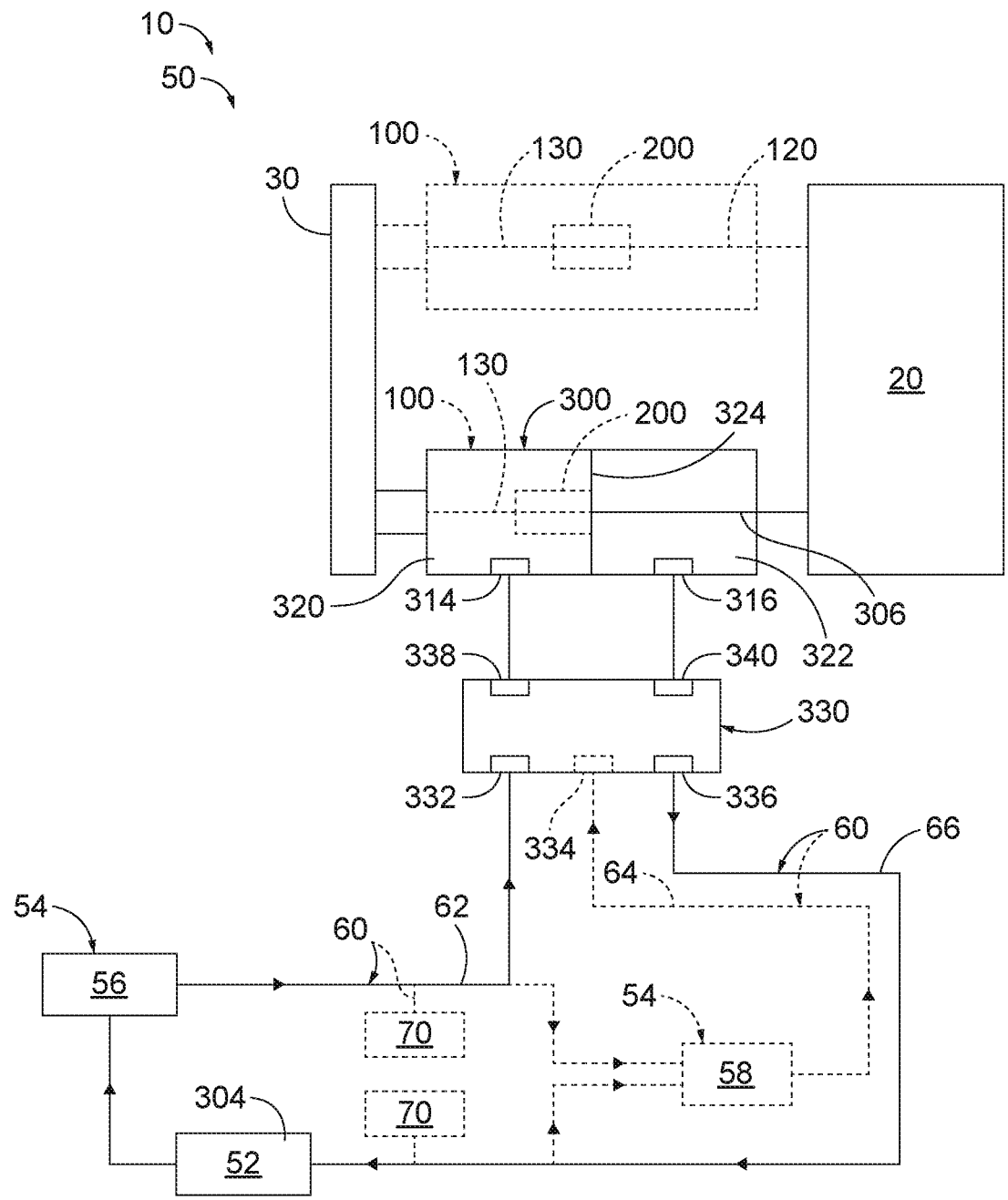
FIG. 12 is a schematic representation of examples of aircraft hydraulic systems according to the present disclosure.

In some examples, inerter 100 and/or hydraulic actuator 300 is utilized in the context of an aircraft, such as to actuate a flight control surface of the aircraft. More specifically, in such examples, inerter 100 and/or hydraulic actuator 300 may be utilized as components of an aircraft hydraulic system of the aircraft. FIG. 11 illustrates an example of an aircraft 10 with an aircraft hydraulic system 50 that may include inerters 100 and/or hydraulic actuators 300 according to the present disclosure, while FIG. 12 schematically illustrates examples of aircraft hydraulic systems 50 including inerters 100 and/or hydraulic actuators 300 according to the present disclosure. As shown in FIG. 11, aircraft 10 may include one or more wings 12, one or more horizontal stabilizers 14, one or more vertical stabilizers 16, and/or one or more engines 18. Aircraft 10 generally includes one or more flight control surfaces 20 movably attached to various portions of aircraft 10, such as to wing(s) 12, horizontal stabilizer(s) 14, and/or vertical stabilizer(s) 16. More specifically, each flight control surface 20 is pivotally coupled to a respective control surface support structure 30, such as may be a component of wing 12, of horizontal stabilizer 14, and/or of vertical stabilizer 16. Examples of flight control surfaces 20 include an aileron, a rudder, an elevator, a flap, a spoiler, and an air brake. More specifically, in some examples, wing 12 includes flight control surface 20 in the form of one or more of a slat, a flap, an aileron, a flaperon, a spoiler, and an air brake. Additionally or alternatively, in some examples, horizontal stabilizer 14 includes flight control surface 20 in the form of an elevator. Additionally or alternatively, in some examples, vertical stabilizer 16 includes flight control surface 20 in the form of a rudder.

FIG. 12 schematically illustrates examples of aircraft hydraulic systems 50 including inerters 100 and/or hydraulic actuators 300 according to the present disclosure, such as may be configured to operate one or more flight surfaces 20 of aircraft 10. As schematically illustrated in FIG. 12, aircraft hydraulic system 50 according to the present disclosure includes a fluid reservoir 52 containing a volume of hydraulic fluid 304, one or more hydraulic pumps 54 configured to pressurize hydraulic fluid 304, a plurality of hydraulic conduits 60 configured to convey hydraulic fluid 304 among components of aircraft hydraulic system 50, and at least one hydraulic actuator 300 according to the present disclosure. As schematically illustrated in FIG. 12, hydraulic actuator 300 of aircraft hydraulic system 50 is configured to selectively actuate (e.g., pivot) flight control surface 20 relative to a corresponding control surface support structure 30, such as to at least partially control aircraft 10 during flight.

Each hydraulic pump 54 may be configured to pressurize hydraulic fluid 304 to any appropriate pressure. In some examples, and as schematically illustrated in FIG. 12 and as described in more detail herein, at least one hydraulic pump 54 is a central pump 56 that is configured to pressurize hydraulic fluid 304 to a base pressure, and at least one other hydraulic pump 54 is a boost pump 58 that is configured to pressurize hydraulic fluid 304 to a boost pressure that is greater than the base pressure. In some examples, central pump 56 supplies the flow of hydraulic fluid 304 to fluid input 332 of hydraulic valve 330. Additionally or alternatively, in some examples, boost pump 58 supplies the flow of hydraulic fluid 304 to fluid boost input 334 of hydraulic valve 330.

In some examples, the base pressure additionally or alternatively may be referred to as a quiescent pressure, while the boost pressure may be referred to as a variable pressure. As used herein, a pressure of hydraulic fluid 304 produced by central pump 56 and/or by boost pump 58 may be described as an operating pressure of aircraft hydraulic system 50 and/or of a component thereof, such as hydraulic actuator 300. The base pressure and the boost pressure may have any appropriate respective values. As examples, the base pressure and/or the boost pressure each may be at least 800 pounds per square inch (psi), at least 1000 psi, at least 1300 psi, at least 1500 psi, at least 2000 psi, at least 2500 psi, at least 3000 psi, at least 5000 psi, at least 10000 psi, at most 12000 psi, at most 7000 psi, at most 2700 psi, at most 2200 psi, at most 1700 psi, at most 1200 psi, and/or at most 900 psi. As a more specific example, the base pressure produced by central pump 56 may be about 1200 psi and, the boost pressure produced by boost pump 58 may be about 3000 psi. Central pump 56 and/or boost pump 58 may include and/or be any appropriate hydraulic pump, such as an engine-driven hydraulic pump and/or an electric-motor-driven hydraulic pump. Stated differently, in some examples, at least one engine 18 of aircraft 10 at least partially powers at least one hydraulic pump 54 of aircraft hydraulic system 50.

While FIG. 12 schematically illustrates aircraft hydraulic system 50 as including a single central pump 56 and a single boost pump 58, it is additionally within the scope of the present disclosure that aircraft hydraulic system 50 includes more than one central pump 56 and/or more than one boost pump 58. In some examples, aircraft 10 and/or aircraft hydraulic system 50 includes a number of boost pumps 58 that is equal to the number of hydraulic actuators 300 that serve a common load and/or the number of hydraulic actuators 300 that are served by aircraft hydraulic system 50.

In some examples, and as further schematically illustrated in FIG. 12, the plurality of hydraulic conduits 60 includes one or more supply lines 62 configured to convey hydraulic fluid 304 at the base pressure, one or more boost lines 64 configured to convey hydraulic fluid 304 at the boost pressure, and/or one or more return lines 66 configured to convey hydraulic fluid 304 at a pressure that is less than the base pressure. Return lines 66 may carry hydraulic fluid 304 to fluid reservoir 52, where hydraulic fluid 304 may be stored and cooled before being re-supplied to hydraulic pump 54. In the event that an inadequate amount of hydraulic fluid 304 is available at boost pump 58, returning hydraulic fluid 304 may be supplied to boost pump 58 before it is moved along return line 66 to fluid reservoir 52.

In some examples, and as further schematically illustrated in FIG. 12, aircraft hydraulic system 50 additionally includes one or more accumulators 70 for maintaining a pressure of hydraulic fluid 304 within hydraulic conduits 60. As schematically illustrated in FIG. 12, accumulator 70 may be connected to supply line 62 downstream from central pump 56, and/or may be connected to return line 66 upstream of fluid reservoir 52, to supply additional hydraulic fluid 304 for use in aircraft hydraulic system 50. Accumulator 70 may supply hydraulic fluid 304 in certain circumstances, such as but not limited to when a volume of hydraulic fluid 304 moving along supply line 62 drops below a predetermined level or when a pressure of hydraulic fluid 304 in supply line 62 is below a predetermined level.

When present, boost pump 58 is positioned along aircraft hydraulic system 50 away from central pump 56. This distributed architecture may provide for more responsiveness as hydraulic fluid 304 as the boost pressure can be supplied to hydraulic actuators 300 in less time. The distributed architecture also allows for hydraulic fluid 304 from hydraulic actuators 300 to bypass a portion of return line 66 and be directed to boost pump 58. This feature saves energy loss due to a pressure drop in return line 66 that routes hydraulic fluid 304 back to the central pump 56, and thereby reduced peak power demand.

In general, each hydraulic pump 54 (such as central pump 56 and/or boost pump 58) may be configured to pressurize hydraulic fluid 304 to a variable pressure. In this manner, an example of aircraft hydraulic system 50 that includes central pump 56 but not boost pump 58 may be capable of meeting the varying operational demands of each hydraulic actuator 300 through variation of the operating pressure. For example, such an aircraft hydraulic system 50 may produce a varying pressure of hydraulic fluid 304 that depends upon the phase of flight in which aircraft 10 operates (e.g., a take-off phase, a cruising phase, or a landing phase). However, in an example in which aircraft hydraulic system 50 lacks boost pump 58, central pump 56 generally must operate at a sufficiently high pressure to serve the pressure requirements of the single hydraulic actuator 300 of the plurality of hydraulic actuators 300 that encounters the highest aerodynamic-resultant load-pressure at a given instant. By contrast, and as described herein, utilizing central pump 56 in combination with one or more boost pumps 58 (e.g., up to and including a number of boost pumps 58 equal to the number of sets of hydraulic actuators 300 serving a common load and/or the number of hydraulic actuators 300 served by the hydraulic system) may enable selective variation of the respective operating pressures of a plurality of hydraulic actuators 300 at a given instant.

Aircraft 10 may include multiple aircraft hydraulic systems 50 to control the movement of flight control surfaces 20. For example, aircraft 10 may include a first aircraft hydraulic system 50 that extends along a first portion of the aircraft (e.g., a starboard side). In some such examples, the first aircraft hydraulic system 50 includes central pump 56 that is driven by a first engine 18 (e.g., a starboard engine 18). In some such examples, a second aircraft hydraulic system 50 is positioned on a second portion of the aircraft (e.g., a port side) and includes a separate central pump 56 that is driven by a different engine 18 (e.g., a port engine 18). The number of engines 18 and/or the number of aircraft hydraulic systems 50 in aircraft 10 may vary. As examples, aircraft 10 may include one engine 18, two engines 18, three engines 18, four engines 18, or more than four engines 18. Further, each engine 18 may drive any appropriate number of central pumps 56. For example, aircraft 10 may include four main engines 18, namely two left main engines 18 and two right main engines 18. In some examples, each main engine 18 drives two respective central pumps 56. In some such examples, aircraft 10 includes two aircraft hydraulic systems 50, such that the four central pumps 56 associated with the left main engines 18 produce hydraulic power to a left aircraft hydraulic system 50 and such that the four central pumps 56 associated with the right main engines 18 produce hydraulic power to a right aircraft hydraulic system 50.

In some examples, operative use of aircraft hydraulic system 50 to operate flight control surface 20 includes operating within a dynamic regime in which flight control surface 20 is prone to an undesirable degree of flutter susceptibility or response during flight of aircraft 10. Stated differently, flight control surface 20 may be characterized by a resonance condition in which flutter may occur, and a configuration of hydraulic actuator 300 may cause the operational bandwidth of hydraulic actuator 300 to overlap with such a resonance condition in the absence of inerter 100. Utilizing hydraulic actuators 300 including inerter 100 thus may mitigate and/or minimize the flutter of flight control surface 20 by damping an oscillation of flight control surface 20. Accordingly, in some examples, inerter 100 operates to provide critical damping of an oscillation of flight control surface 20, thus expanding the practical operational bandwidth of hydraulic actuator 300, such as to lower a peak power demand of the aircraft hydraulic system 50. Stated differently, in some examples, damping the movement of flight control surface 20 with inerter 100 provides increased flutter suppression, which in turn may result in an improved hydraulic application stability and an increased efficient flight control actuation by hydraulic actuator 300.

As discussed, and as schematically illustrated in FIGS. 1-2, inerter 100 may be a component of and/or incorporated into hydraulic actuator 300 (e.g., into actuator housing 310). Such a configuration also is schematically illustrated in FIG. 12. Additionally or alternatively, in some examples, and as further schematically illustrated in FIG. 12, inerter 100 is separate from hydraulic actuator 300, with each of inerter 100 and hydraulic actuator 300 being operatively coupled to each of flight control surface 20 and control surface support structure 30. In such examples, inerter 100 and hydraulic actuator 300 may be described as operating in parallel to actuate flight control surface 20 while concurrently damping an oscillation of flight control surface 20.

Hydraulic valve 330 may have any appropriate structure and/or configuration, such as may be known to the art of hydraulic systems. Examples of aircraft hydraulic systems 50 and/or of hydraulic valves 330 that may be utilized in conjunction with aircraft hydraulic systems 50 and/or with inerters 100 according to the present disclosure are disclosed in U.S. Patent Application Publication No. 2019/0315456, U.S. Patent Application Publication No. 2019/0316606, U.S. Patent Application Publication No. 2019/0316607, and U.S. patent application Ser. No. 16/811,979, the complete disclosures of which are hereby incorporated by reference.

While the present disclosure generally describes inerters 100 and/or hydraulic actuators 300 in the context of aircraft hydraulic systems 50 that include the inerters 100 and/or hydraulic actuators 300, this is not required, and it is additionally within the scope of the present disclosure that inerters 100 and/or hydraulic actuators 300 may be utilized in any appropriate context. As examples, inerters 100 and/or hydraulic actuators 300 may be implemented in any type of open-loop or closed-loop control system for use in any one of a variety of different applications in any industry, without limitation. In this regard, inerters 100 and/or hydraulic actuators 300 according to the present disclosure may be implemented in any vehicular application or non-vehicular application. As examples, inerters 100 and/or hydraulic actuators 300 may be implemented in any marine, ground, air, and/or space application, and in any vehicular or non-vehicular system, subsystem, assembly, subassembly, structure, building, machine, or application that utilizes an actuator to actuate a movable device.

Illustrative, non-exclusive examples of inventive subject matter according to the present disclosure are described in the following enumerated paragraphs:

A1. An inerter (100), comprising:

a first terminal (102) and a second terminal (104) that are configured to translate relative to one another along an inerter axis (106);

an inerter housing (110);

a threaded shaft (130) extending along the inerter axis (106) within the inerter housing (110); wherein the threaded shaft (130) is fixed relative to the first terminal (102) and terminates in a shaft free end (132);

an inerter rod (120) extending along the inerter axis (106) at least partially within the inerter housing (110); wherein the inerter rod (120) is fixed relative to the second terminal (104);

a friction disk assembly (200) positioned within the inerter housing (110) and operatively coupled to each of the threaded shaft (130) and the inerter rod (120); and an inerter fluid (108) contained within the inerter housing (110);

wherein the inerter (100) is configured to resist acceleration of the second terminal (104) relative to the first terminal (102); and wherein the friction disk assembly (200) and the inerter fluid (108) together are configured to damp a motion of the second terminal (104) relative to the first terminal (102).

A2. The inerter (100) of paragraph A1, wherein the friction disk assembly (200) includes a fixed portion (210) that is at least substantially rotationally fixed relative to the inerter rod (120) and a rotating portion (250) that is configured to rotate about the inerter axis (106) relative to the fixed portion (210); and wherein the friction disk assembly (200) is configured such that rotation of the rotating portion (250) relative to the fixed portion (210) creates a shear stress in the inerter fluid (108) that generates a frictional torque that opposes the rotation of the rotating portion (250) relative to the fixed portion (210).

A3. The inerter (100) of paragraph A2, wherein the friction disk assembly (200) is configured such that the rotating portion (250) rotates relative to the fixed portion (210) about the inerter axis (106) at a rotational velocity that is directly proportional to a linear velocity at which the second terminal (104) translates relative to the first terminal (102) along the inerter axis (106).

A4. The inerter (100) of paragraph A3, wherein the friction disk assembly (200) is configured such that translating the second terminal (104) relative to the first terminal (102) along the inerter axis (106) at the linear velocity urges the rotating portion (250) to rotate relative to the fixed portion (210) at the rotational velocity.

A5. The inerter (100) of any of paragraphs A2-A4, wherein the fixed portion (210) includes:
a disk housing (220); and
one or more outer disks (230) positioned within the disk housing (220);
wherein the rotating portion (250) includes:
an inner disk sleeve (260) extending at least partially within the disk housing (220); and
a plurality of inner disks (270) mounted on the inner disk sleeve (260) such that the inner disk sleeve (260) and the plurality of inner disks (270) are configured to rotate relative to the one or more outer disks (230) at least substantially in unison.

A6. The inerter (100) of paragraph A5, wherein the one or more outer disks (230) and the plurality of inner disks (270) are interleaved with one another such that each outer disk (230) of the one or more outer disks (230) is positioned between a corresponding pair of inner disks (270) of the plurality of inner disks (270).

A7. The inerter (100) of paragraph A6, wherein each outer disk (230) of the one or more outer disks (230) is separated from each of the corresponding pair of inner disks (270) by a respective shear region (298) that is occupied by the inerter fluid (108); and wherein rotation of the plurality of inner disks (270) relative to the one or more outer disks (230) produces the shear stress in the inerter fluid (108) within each shear region (298), thereby exerting the frictional torque on the plurality of inner disks (270) to oppose rotation of the rotating portion (250) relative to the fixed portion (210).

A8. The inerter (100) of any of paragraphs A5-A7, wherein each inner disk (270) of the plurality of inner disks (270) includes:
an inner disk central region (272) with an inner disk central thickness (274), as measured along a direction parallel to the inerter axis (106); and an inner disk peripheral region (280) with an inner disk peripheral thickness (282), as measured along a direction parallel to the inerter axis (106);
wherein the inner disk central thickness (274) is greater than the inner disk peripheral thickness (282).

A9. The inerter (100) of paragraph A8, wherein the inner disk central thickness (274) of each inner disk (270) of the plurality of inner disks (270) is at least substantially constant across an area of the inner disk central region (272).

A10. The inerter (100) of any of paragraphs A8-A9, wherein the inner disk peripheral thickness (282) of each inner disk (270) of the plurality of inner disks (270) is at least substantially constant across an area of the inner disk peripheral region (280).

A11. The inerter (100) of any of paragraphs A8-A10, wherein the inner disk central region (272) of each inner disk (270) defines an inner disk aperture (286); and wherein the inner disk sleeve (260) extends through the inner disk aperture (286) of each inner disk (270).

A12. The inerter (100) of any of paragraphs A8-A11, wherein the plurality of inner disks (270) are positioned on the inner disk sleeve (260) such that the inner disk central region (272) of each inner disk (270) abuts the inner disk central region (272) of each adjacent inner disk (270).

A13. The inerter (100) of paragraph A12, wherein the plurality of inner disks (270) are positioned on the inner disk sleeve (260) such that the respective inner disk peripheral regions (280) of each pair of adjacent inner disks (270) are spaced apart by an inner disk peripheral gap (292), and wherein each outer disk (230) of the one or more outer disks (230) is positioned at least substantially within the inner disk peripheral gap (292) formed between a/the corresponding pair of inner disks (270).

A14. The inerter (100) of paragraph A13, wherein the inner disk peripheral gap (292) has a peripheral gap width (294), as measured along a direction parallel to the inerter axis (106), that is at least substantially equal to a difference between the inner disk central thickness (274) and the inner disk peripheral thickness (282).

A15. The inerter (100) of any of paragraphs A8-A14, wherein each inner disk (270) of the plurality of inner disks (270) has:
an inner disk outer diameter (284), as measured diametrically across the inner disk peripheral region (280) along a direction perpendicular to the inerter axis (106);
an inner disk central diameter (276), as measured diametrically across the inner disk central region (272) along a direction perpendicular to the inerter axis (106); and
an inner disk inner diameter (288), as measured diametrically across a/the inner disk aperture (286) along a direction perpendicular to the inerter axis (106).

A16. The inerter (100) of any of paragraphs A5-A15, wherein each outer disk (230) of the one or more outer disks (230) defines an outer disk aperture (238) that defines an outer disk inner diameter (232) of the outer disk (230), as measured diametrically across the outer disk aperture (238) along a direction perpendicular to the inerter axis (106).

A17. The inerter (100) of paragraph A16, wherein the outer disk inner diameter (232) is greater than a/the inner disk central diameter (276) of each of a/the corresponding pair of inner disks (270).

A18. The inerter (100) of any of paragraphs A16-A17, wherein the outer disk aperture (238) of each outer disk (230) extends circumferentially around the inner disk central region (272) of one or both of a/the corresponding pair of inner disks (270).

A19. The inerter (100) of any of paragraphs A5-A18, wherein each outer disk (230) of the one or more outer disks (230) has an outer disk outer diameter (234), as measured diametrically across the outer disk (230) along a direction perpendicular to the inerter axis (106), that is greater than a/the inner disk outer diameter (284) of each of a/the corresponding pair of inner disks (270).

A20. The inerter (100) of any of paragraphs A5-A19, wherein each outer disk (230) of the one or more outer disks (230) has an outer disk thickness (236), as measured along a direction parallel to the inerter axis (106), that is less than a/the peripheral gap width (294) of a/the inner disk peripheral gap (292) between a/the corresponding pair of inner disks (270).

A21. The inerter (100) of paragraph A20, wherein the outer disk thickness (236) of each outer disk (230) of the one or more outer disks (230) is at least substantially constant across an area of the outer disk (230).

A22. The inerter (100) of any of paragraphs A5-A21, wherein each outer disk (230) of the one or more outer disks (230) is spaced apart from a/the respective inner disk peripheral regions (280) of each of a/the corresponding pair of inner disks (270) by a disk spacing (296), as measured along a direction parallel to the inerter axis (106), that is at least substantially equal to half the difference between a/the peripheral gap width (294) and a/the outer disk thickness (236).

A23. The inerter (100) of any of paragraphs A5-A22, wherein each outer disk (230) of the one or more outer disks (230) is positioned at least substantially equidistant from a/the respective inner disk peripheral regions (280) of a/the corresponding pair of inner disks (270).

A24. The inerter (100) of any of paragraphs A7-A23, wherein the shear region (298) between each outer disk (230) of the one or more outer disks (230) and either of the corresponding pair of inner disks (270) is an annular volume with an inner diameter equal to a/the outer disk inner diameter (232), an outer diameter equal to a/the inner disk outer diameter (284), and a thickness equal to a/the disk spacing (296).

A25. The inerter (100) of any of paragraphs A5-A24, wherein the disk housing (220) includes a disk housing engagement structure (222); and wherein each outer disk (230) of the one or more outer disks (230) includes an outer disk engagement structure (240) that engages the disk housing engagement structure (222) to restrict each outer disk (230) from rotating relative to the disk housing (220).

A26. The inerter (100) of paragraph A25, wherein the disk housing engagement structure (222) and each outer disk engagement structure (240) are configured to permit each outer disk (230) of the one or more outer disks (230) to translate relative to the disk housing (220) along a direction parallel to the inerter axis (106).

A27. The inerter (100) of any of paragraphs A25-A26, wherein each of the disk housing engagement structure (222) and each outer disk engagement structure (240) includes one or both of a plurality of splines and a plurality of grooves.

A28. The inerter (100) of any of paragraphs A25-A27, wherein the outer disk engagement structure (240) of each outer disk (230) of the one or more outer disks (230) is defined on an outer peripheral region of the outer disk (230).

A29. The inerter (100) of any of paragraphs A5-A28, wherein the inner disk sleeve (260) includes an inner disk sleeve engagement structure (266); and wherein each inner disk (270) of the plurality of inner disks (270) includes an inner disk engagement structure (290) that engages the inner disk sleeve engagement structure (266) to restrict each inner disk (270) from rotating relative to the inner disk sleeve (260).

A30. The inerter (100) of paragraph A29, wherein each of the inner disk sleeve engagement structure (266) and each inner disk engagement structure (290) includes one or both of a plurality of splines and a plurality of grooves.

A31. The inerter (100) of any of paragraphs A29-A30, wherein a/the inner disk aperture (286) of each inner disk (270) of the plurality of inner disks (270) includes the inner disk engagement structure (290).

A32. The inerter (100) of any of paragraphs A5-A31, wherein the inner disk sleeve (260) is operatively coupled to the threaded shaft (130) with the threaded shaft (130) extending through the inner disk sleeve (260).

A33. The inerter (100) of paragraph A32, wherein the inner disk sleeve (260) is threadably coupled to the threaded shaft (130) such that the inner disk sleeve (260) rotates relative to the threaded shaft (130) about the inerter axis (106) as the inner disk sleeve (260) translates relative to the threaded shaft (130) along the inerter axis (106).

A34. The inerter (100) of any of paragraphs A5-A33, wherein the rotating portion (250) further includes a first disk retention structure (252) positioned on a first end (262) of the inner disk sleeve (260) and a second disk retention structure (254) positioned on a second end (264) of the inner disk sleeve (260); wherein each inner disk (270) of the plurality of inner disks (270) is mounted on the inner disk sleeve (260) between the first disk retention structure (252) and the second disk retention structure (254); and wherein the first disk retention structure (252) and the second disk retention structure (254) together maintain the plurality of inner disks (270) mounted on the inner disk sleeve (260).

A35. The inerter (100) of paragraph A34, wherein one of the first disk retention structure (252) and the second disk retention structure (254) is integrally formed with the inner disk sleeve (260).

A36. The inerter (100) of paragraph A35, wherein one of the first disk retention structure (252) and the second disk retention structure (254) is a flange that is integral with the inner disk sleeve (260) and that extends away from the inerter axis (106).

A37. The inerter (100) of any of paragraphs A34-A36, wherein one or both of the first disk retention structure (252) and the second disk retention structure (254) is configured to be selectively and operatively coupled to the inner disk sleeve (260).

A38. The inerter (100) of paragraph A37, wherein one or both of the first disk retention structure (252) and the second disk retention structure (254) is a retention nut that is threadably coupled to the inner disk sleeve (260).

A39. The inerter (100) of paragraph A38, wherein the retention nut includes, and optionally is, one or both of a lock nut and a jam nut.

A40. The inerter (100) of any of paragraphs A5-A39, wherein the friction disk assembly (200) further includes a sleeve bearing (256) that operatively couples the inner disk sleeve (260) to the fixed portion (210); wherein the sleeve bearing (256) is configured to enable the inner disk sleeve (260) to rotate relative to the fixed portion (210).

A41. The inerter (100) of paragraph A40, wherein the sleeve bearing (256) operatively couples the inner disk sleeve (260) to the fixed portion (210) such that the inner disk sleeve (260) and the fixed portion (210) translate relative to the threaded shaft (130) along the inerter axis (106) at least substantially in unison.

A42. The inerter (100) of any of paragraphs A40-A41, wherein the sleeve bearing (256) includes, and optionally is, a thrust bearing.

A43. The inerter (100) of any of paragraphs A5-A42, wherein the one or more outer disks (230) consists of one or more of at least 1 outer disk (230), at least 3 outer disks (230), at least 5 outer disks (230), at least 10 outer disks (230), at most 15 outer disks (230), at most 7 outer disks (230), and at most 2 outer disks (230).

A44. The inerter (100) of any of paragraphs A5-A43, wherein the plurality of inner disks (270) consists of one or more of at least 2 inner disks (270), at least 3 inner disks (270), at least 5 inner disks (270), at least 10 inner disks (270), at most 15 inner disks (270), at most 7 inner disks (270), and at most 4 inner disks (270).

A45. The inerter (100) of any of paragraphs A5-A44, wherein the number of inner disks (270) in the plurality of inner disks (270) is one greater than the number of outer disks (230) in the one or more outer disks (230).

A46. The inerter (100) of any of paragraphs A1-A45, further comprising a flywheel (140) that is configured to rotate about the inerter axis (106) relative to the threaded shaft (130) with a rotational velocity that is proportional to a linear velocity at which the inerter rod (120) translates with respect to the threaded shaft (130).

A47. The inerter (100) of paragraph A46, wherein the flywheel (140) is threadably coupled to the threaded shaft (130) such that the flywheel (140) rotates relative to the threaded shaft (130) about the inerter axis (106) as the flywheel (140) translates relative to the threaded shaft (130) along the inerter axis (106).

A48. The inerter (100) of any of paragraphs A46-A47, wherein a/the rotating portion (250) of the friction disk assembly (200) includes the flywheel (140).

A49. The inerter (100) of any of paragraphs A46-A48, wherein one or both of a/the first disk retention structure (252) and a/the second disk retention structure (254) includes, and optionally is, the flywheel (140).

A50. The inerter (100) of any of paragraphs A46-A49, wherein the flywheel (140) includes a plurality of flywheel protrusions (142) extending radially away from the inerter axis (106); and wherein, when the flywheel (140) rotates about the inerter axis (106), the plurality of flywheel protrusions (142) moves through the inerter fluid (108) to produce a viscous damping force that impedes rotation of the flywheel (140) about the inerter axis (106).

A51. The inerter (100) of any of paragraphs A1-A50, wherein the inerter fluid (108) includes one or more of a viscous fluid, an oil, and a hydraulic fluid.

A52. The inerter (100) of any of paragraphs A1-A51, wherein the inerter rod (120) is hollow and defines an inerter rod bore (122); and wherein the shaft free end (132) is received within the inerter rod bore (122).

A53. The inerter (100) of any of paragraphs A1-A52, wherein the threaded shaft (130) is hollow and defines a shaft bore (134) that is open on the shaft free end (132) of the threaded shaft (130).

A54. The inerter (100) of paragraph A53, wherein the threaded shaft (130) includes one or more radial passages (136) extending radially from the shaft bore (134) to an exterior side of the threaded shaft (130) to allow fluid flow between the shaft bore (134) and the exterior side of the threaded shaft (130).

B1. A hydraulic actuator (300), comprising:
an actuator housing (310) with a first port (314) and a second port (316) and enclosing an actuator volume (312) that contains a hydraulic fluid (304);
a piston (324) positioned within the actuator housing (310), wherein the piston (324) partitions the actuator volume (312) into a first chamber (320) in fluid communication with the first port (314) and a second chamber (322) in fluid communication with the second port (316);
an actuator rod (306) extending from the piston (324) and at least partially out of the actuator housing (310), wherein the actuator rod (306) is configured to translate relative to the actuator housing (310) along an actuator axis (302);
a hydraulic valve (330) that regulates a flow of the hydraulic fluid (304) into and out of the first chamber (320) and the second chamber (322) to control a position of the piston (324) within the actuator housing (310); and
the inerter (100) of any of paragraphs A1-A54.

B2. The hydraulic actuator (300) of paragraph B1, wherein the actuator housing (310) is the inerter housing (110).

B3. The hydraulic actuator (300) of any of paragraphs B1-B2, wherein the actuator rod (306) is the inerter rod (120).

B4. The hydraulic actuator (300) of any of paragraphs B1-B3, wherein a/the fixed portion (210) includes the piston (324).

B5. The hydraulic actuator (300) of paragraph B4, wherein a/the disk housing (220) is fixedly coupled to the piston (324).

B6. The hydraulic actuator (300) of any of paragraphs B4-B5, wherein a/the sleeve bearing (256) operatively couples a/the inner disk sleeve (260) to the piston (324).

B7. The hydraulic actuator (300) of any of paragraphs B1-B6, wherein the hydraulic fluid (304) is the inerter fluid (108).

B8. The hydraulic actuator (300) of any of paragraphs B1-B7, wherein the hydraulic valve (330) includes:
a fluid input (332) configured to receive a high-pressure flow of the hydraulic fluid (304);
a fluid return (336) configured to discharge a low-pressure flow of the hydraulic fluid (304);
a first outlet (338) that is fluidly connected to the first chamber (320) of the actuator housing (310) via the first port (314); and
a second outlet (340) that is fluidly connected to the second chamber (322) of the actuator housing (310) via the second port (316); and
wherein the hydraulic valve (330) is configured to regulate the flow of the hydraulic fluid (304) from the fluid input (332) to the actuator housing (310) and to the fluid return (336) to control the position of the piston (324) within the actuator housing (310).

B9. The hydraulic actuator (300) of paragraph B8, wherein the hydraulic valve (330) further includes a fluid boost input (334) configured to receive a flow of the hydraulic fluid (304) at a boost pressure that is higher than the pressure of the high-pressure flow of the hydraulic fluid (304).

C1. An aircraft hydraulic system (50) for operating one or more flight control surfaces (20) of an aircraft (10) that are operatively coupled to a corresponding one or more control surface support structures (30) of the aircraft (10), the aircraft hydraulic system (50) comprising:
a fluid reservoir (52) containing a volume of hydraulic fluid (304);
one or more hydraulic pumps (54), each hydraulic pump (54) configured to pressurize the hydraulic fluid (304);
a plurality of hydraulic conduits (60) configured to convey the hydraulic fluid (304) among components of the aircraft hydraulic system (50); and
the hydraulic actuator (300) of any of paragraphs B1-B9 configured to selectively pivot a respective flight control surface (20) of the one or more flight control surfaces (20) relative to the corresponding control surface support structure (30).

C2. The aircraft hydraulic system (50) of paragraph C1, wherein the one or more hydraulic pumps (54) includes:

a central pump (56) configured to pressurize the hydraulic fluid (304) to a base pressure; and a boost pump (58) configured to pressurize the hydraulic fluid (304) to a boost pressure that is greater than the base pressure.

C3. The aircraft hydraulic system (50) of paragraph C2, wherein one or both of the base pressure and the boost pressure is one or more of at least 800 pounds per square inch (psi), at least 1000 psi, at least 1300 psi, at least 1500 psi, at least 2000 psi, at least 2500 psi, at least 3000 psi, at least 5000 psi, at least 10000 psi, at most 12000 psi, at most 7000 psi, at most 2700 psi, at most 2200 psi, at most 1700 psi, at most 1200 psi, and at most 900 psi.

C4. The aircraft hydraulic system (50) of any of paragraphs C2-C3, wherein the plurality of hydraulic conduits (60) includes:

(i) one or more supply lines (62) configured to convey the hydraulic fluid (304) at the base pressure;

(ii) one or more boost lines (64) configured to convey the hydraulic fluid (304) at the boost pressure; and (III) one or more return lines (66) configured to convey the hydraulic fluid (304) at a pressure that is less than the base pressure.

C5. The aircraft hydraulic system (50) of any of paragraphs C2-C4, wherein the central pump (56) supplies the flow of the hydraulic fluid (304) to a/the fluid input (332) of the hydraulic valve (330).

C6. The aircraft hydraulic system (50) of any of paragraphs C2-C5, wherein the boost pump (58) supplies the flow of the hydraulic fluid (304) to a/the fluid boost input (334) of the hydraulic valve (330).

C7. The aircraft hydraulic system (50) of any of paragraphs C1-C6, further comprising one or more accumulators (70) for maintaining a pressure of the hydraulic fluid (304).

D1. An aircraft (10), comprising:

one or more flight control surfaces (20) operatively coupled to a corresponding one or more control surface support structures (30);

the hydraulic actuator (300) of any of paragraphs B1-B9 for pivoting at least one of the one or more flight control surfaces (20) relative to the corresponding control surface support structure (30); and the aircraft hydraulic system (50) of any of paragraphs C1-C7 for operating the hydraulic actuator (300).

D2. The aircraft (10) of paragraph D1, further comprising at least one wing (12); and wherein at least one of the one or more flight control surfaces (20) is a component of the at least one wing (12), optionally one or more of a slat, a flap, an aileron, a flaperon, a spoiler, and an air brake.

D3. The aircraft (10) of any of paragraphs D1-D2, further comprising at least one horizontal stabilizer (14); and wherein at least one of the one or more flight control surfaces (20) is a component of the at least one horizontal stabilizer (14), optionally an elevator.

D4. The aircraft (10) of any of paragraphs D1-D3, further comprising at least one vertical stabilizer (16); and wherein at least one of the one or more flight control surfaces (20) is a component of the at least one vertical stabilizer (16), optionally a rudder.

D5. The aircraft (10) of any of paragraphs D1-D4, further comprising at least one engine (18) that at least partially powers at least one of the one or more hydraulic pumps (54).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. An inerter, comprising:
a first terminal and a second terminal that are configured to translate relative to one another along an inerter axis;
an inerter housing;
a threaded shaft extending along the inerter axis within the inerter housing; wherein the threaded shaft is fixed relative to the first terminal and terminates in a shaft free end;
an inerter rod extending along the inerter axis at least partially within the inerter housing; wherein the inerter rod is fixed relative to the second terminal;
a friction disk assembly positioned within the inerter housing and operatively coupled to each of the threaded shaft and the inerter rod; and
an inerter fluid contained within the inerter housing;
wherein the inerter is configured to resist acceleration of the second terminal relative to the first terminal; wherein the friction disk assembly and the inerter fluid together are configured to damp a motion of the second terminal relative to the first terminal; wherein the friction disk assembly includes a fixed portion that is at least substantially rotationally fixed relative to the inerter rod and a rotating portion that is configured to rotate about the inerter axis relative to the fixed portion; wherein the friction disk assembly is configured such that the rotating portion rotates relative to the fixed portion about the inerter axis at a rotational velocity that is directly proportional to a linear velocity at which the second terminal translates relative to the first terminal along the inerter axis; and wherein the friction disk assembly is configured such that rotation of the rotating portion relative to the fixed portion creates a shear stress in the inerter fluid that generates a frictional torque that opposes the rotation of the rotating portion relative to the fixed portion.

2. The inerter of claim 1, wherein the fixed portion includes:
a disk housing; and
one or more outer disks positioned within the disk housing;
wherein the rotating portion includes:
an inner disk sleeve extending at least partially within the disk housing; and
a plurality of inner disks mounted on the inner disk sleeve such that the inner disk sleeve and the plurality of inner disks are configured rotate relative to the one or more outer disks at least substantially in unison;
wherein the one or more outer disks and the plurality of inner disks are interleaved with one another such that each outer disk of the one or more outer disks is positioned between a corresponding pair of inner disks of the plurality of inner disks.

3. The inerter of claim 2, wherein each outer disk of the one or more outer disks is separated from each of the corresponding pair of inner disks by a respective shear region that is occupied by the inerter fluid; and wherein rotation of the plurality of inner disks relative to the one or more outer disks produces the shear stress in the inerter fluid within each shear region, thereby exerting a frictional torque on the plurality of inner disks to oppose rotation of the rotating portion relative to the fixed portion.

4. The inerter of claim 2, wherein each inner disk of the plurality of inner disks includes:
   an inner disk central region with an inner disk central thickness, as measured along a direction parallel to the inerter axis; and
   an inner disk peripheral region with an inner disk peripheral thickness, as measured along a direction parallel to the inerter axis;
   wherein the inner disk central thickness is greater than the inner disk peripheral thickness; and
   wherein the plurality of inner disks are positioned on the inner disk sleeve such that the inner disk central region of each inner disk abuts the inner disk central region of each adjacent inner disk.

5. The inerter of claim 4, wherein each inner disk of the plurality of inner disks has an inner disk central diameter, as measured diametrically across the inner disk central region along a direction perpendicular to the inerter axis; wherein each outer disk of the one or more outer disks defines an outer disk aperture that defines an outer disk inner diameter of the outer disk, as measured diametrically across the outer disk aperture along the direction perpendicular to the inerter axis; wherein the outer disk inner diameter is greater than the inner disk central diameter of each of the corresponding pair of inner disks; and wherein the outer disk aperture of each outer disk extends circumferentially around the inner disk central region of one or both of the corresponding pair of inner disks.

6. The inerter of claim 4, wherein each outer disk of the one or more outer disks is spaced apart from the respective inner disk peripheral region of each of the corresponding pair of inner disks by a disk spacing, as measured along a direction parallel to the inerter axis.

7. The inerter of claim 6, wherein the plurality of inner disks are positioned on the inner disk sleeve such that the respective inner disk peripheral regions of each pair of adjacent inner disks are spaced apart by an inner disk peripheral gap with a peripheral gap width, as measured along a direction parallel to the inerter axis, that is at least substantially equal to a difference between the inner disk central thickness and the inner disk peripheral thickness; wherein each outer disk of the one or more outer disks is positioned at least substantially within the inner disk peripheral gap formed by the corresponding pair of inner disks; wherein each outer disk of the one or more outer disks has an outer disk thickness, as measured along a direction parallel to the inerter axis; and wherein the disk spacing is at least substantially equal to half the difference between the peripheral gap width and the outer disk thickness.

8. The inerter of claim 2, wherein the inner disk sleeve is operatively coupled to the threaded shaft with the threaded shaft extending through the inner disk sleeve; and wherein the inner disk sleeve is threadably coupled to the threaded shaft such that the inner disk sleeve rotates relative to the threaded shaft about the inerter axis as the inner disk sleeve translates relative to the threaded shaft along the inerter axis.

9. The inerter of claim 2, wherein the friction disk assembly further includes a sleeve bearing that operatively couples the inner disk sleeve to the fixed portion; wherein the sleeve bearing is configured to enable the inner disk sleeve to rotate relative to the fixed portion; and wherein the sleeve bearing operatively couples the inner disk sleeve to the fixed portion such that the inner disk sleeve and the fixed portion translate along the inerter axis at least substantially in unison.

10. The inerter of claim 2, wherein the disk housing includes a disk housing engagement structure; and wherein each outer disk of the one or more outer disks includes an outer disk engagement structure that engages the disk housing engagement structure to restrict each outer disk from rotating relative to the disk housing.

11. The inerter of claim 10, wherein the outer disk engagement structure of each outer disk of the one or more outer disks is defined on an outer peripheral region of the outer disk.

12. The inerter of claim 2, wherein the inner disk sleeve includes an inner disk sleeve engagement structure; and wherein each inner disk of the plurality of inner disks includes an inner disk engagement structure that engages the inner disk sleeve engagement structure to restrict each inner disk from rotating relative to the inner disk sleeve.

13. The inerter of claim 12, wherein each inner disk of the plurality of inner disks includes an inner disk central region that defines an inner disk aperture; wherein the inner disk sleeve extends through the inner disk aperture of each inner disk of the plurality of inner disks; and wherein the inner disk aperture of each inner disk of the plurality of inner disks includes the inner disk engagement structure.

14. The inerter of claim 2, wherein the rotating portion further includes a first disk retention structure positioned on a first end of the inner disk sleeve and a second disk retention structure positioned on a second end of the inner disk sleeve; wherein each inner disk of the plurality of inner disks is mounted on the inner disk sleeve between the first disk retention structure and the second disk retention structure; and wherein the first disk retention structure and the second disk retention structure together maintain the plurality of inner disks mounted on the inner disk sleeve.

15. The inerter of claim 1, wherein the rotating portion of the friction disk assembly includes a flywheel that is configured to rotate about the inerter axis relative to the threaded shaft with a rotational velocity that is proportional to a linear velocity at which the inerter rod translates with respect to the threaded shaft.

16. A hydraulic actuator, comprising:
   an actuator housing with a first port and a second port and enclosing an actuator volume that contains a hydraulic fluid;
   a piston positioned within the actuator housing, wherein the piston partitions the actuator volume into a first chamber in fluid communication with the first port and a second chamber in fluid communication with the second port;
   an actuator rod extending from the piston and at least partially out of the actuator housing, wherein the actuator rod is configured to translate relative to the actuator housing along an actuator axis;
   a hydraulic valve that regulates a flow of the hydraulic fluid into and out of the first chamber and the second chamber to control a position of the piston within the actuator housing; and
   the inerter of claim 1.

17. The hydraulic actuator of claim 16, wherein the hydraulic valve includes:
   a fluid input configured to receive a high-pressure flow of the hydraulic fluid;

a fluid boost input configured to receive a flow of the hydraulic fluid at a boost pressure that is higher than the pressure of the high-pressure flow of the hydraulic fluid;

a fluid return configured to discharge a low-pressure flow of the hydraulic fluid;

a first outlet that is fluidly connected to the first chamber of the actuator housing via the first port; and a second outlet that is fluidly connected to the second chamber of the actuator housing via the second port; and wherein the hydraulic valve is configured to regulate the flow of the hydraulic fluid from the fluid input to the actuator housing and to the fluid return to control the position of the piston within the actuator housing.

18. An aircraft hydraulic system for operating one or more flight control surfaces of an aircraft that are operatively coupled to a corresponding one or more control surface support structures of the aircraft, the aircraft hydraulic system comprising:

a fluid reservoir containing a volume of hydraulic fluid;

one or more hydraulic pumps, each hydraulic pump configured to pressurize the hydraulic fluid;

a plurality of hydraulic conduits configured to convey the hydraulic fluid among components of the aircraft hydraulic system; and the hydraulic actuator of claim 16 configured to selectively pivot a respective flight control surface of the one or more flight control surfaces relative to the corresponding control surface support structure.

19. The aircraft hydraulic system of claim 18, wherein the one or more hydraulic pumps includes:

a central pump configured to pressurize the hydraulic fluid to a base pressure; and a boost pump configured to pressurize the hydraulic fluid to a boost pressure that is greater than the base pressure.

20. An aircraft, comprising:

one or more flight control surfaces operatively coupled to a corresponding one or more control surface support structures;

the hydraulic actuator of claim 18 for pivoting at least one of the one or more flight control surfaces relative to the corresponding control surface support structure; and the aircraft hydraulic system of claim 18 for operating the hydraulic actuator.

* * * * *